(12) United States Patent
Kaji et al.

(10) Patent No.: US 7,720,227 B2
(45) Date of Patent: May 18, 2010

(54) ENCRYPTION METHOD FOR SIP MESSAGE AND ENCRYPTED SIP COMMUNICATION SYSTEM

(75) Inventors: Tadashi Kaji, Yokohama (JP); Osamu Takata, Tokyo (JP); Takahiro Fujishiro, Yokohama (JP); Kazuyoshi Hoshino, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1086 days.

(21) Appl. No.: 11/390,459

(22) Filed: Mar. 28, 2006

(65) Prior Publication Data

US 2006/0236091 A1    Oct. 19, 2006

(30) Foreign Application Priority Data

Mar. 28, 2005    (JP) .............................. 2005-090464

(51) Int. Cl.
H04L 9/00 (2006.01)
H04L 9/08 (2006.01)
H04L 9/32 (2006.01)
H04K 1/00 (2006.01)

(52) U.S. Cl. ....................... 380/259; 380/260; 380/264; 380/277; 380/278; 380/281; 713/171

(58) Field of Classification Search ................ 380/28, 380/259, 260, 264, 277, 278, 281, 282; 713/171
See application file for complete search history.

(56) References Cited

U.S. PATENT DOCUMENTS

2001/0000709 A1 * 5/2001 Takahashi et al. ............ 380/277
2002/0131601 A1 * 9/2002 Ninomiya et al. ............ 380/277
2003/0217165 A1 * 11/2003 Buch et al. ................... 709/229
2004/0264699 A1 * 12/2004 Meandzija et al. .......... 380/270
2005/0005091 A1    1/2005 Suzuki
2005/0226424 A1 * 10/2005 Takata et al. ................ 380/279
2006/0155981 A1    7/2006 Mizutani et al.

FOREIGN PATENT DOCUMENTS

WO    WO 2004/059903 A1    7/2004

OTHER PUBLICATIONS

U.S. Appl. No. 11/258,418.

(Continued)

*Primary Examiner*—Nasser Moazzami
*Assistant Examiner*—Mohammad W Reza
(74) *Attorney, Agent, or Firm*—McDermott Will & Emery LLP

(57) ABSTRACT

It takes time for an encryption data communication system to transfer encrypted data, because negotiations of security parameters are necessary prior to communications in order to protect security and integrity of a SIP message or public key cryptography is required to be used for an encryption process, a decryption process., an digital signature process and an digital digital signature verification process each time a SIP message is transmitted/received. When a SIP message is transferred between two entities, the message is encrypted by shared information if the information is being shared between the entities, or the message is encrypted by the public key of the transmission destination entity if the shared information is not being shared. The encrypted message contains shared information to be used for the transmission destination entity of the encrypted data to encrypt or decrypt the message, during communications after the encrypted data is generated.

13 Claims, 13 Drawing Sheets

OTHER PUBLICATIONS

IEFT, RFC3261, "SIP: Session Initiation Protocol" IETF, Jun. 2002, http://www.ietf.org/rfc/rfc3261.txt.

IETF, RFC2246, "The TLS Protocol Version 1.0" IETF, Jan. 1999, http://www.ietf.org/rfc/rfc2246.txt.

IETF, RFC1847, "Security Multiparts for MIME: Multipart/Sighed and Multipart Encrypted" IETF, Oct. 1995, http://www.ietf.org/rfc/rfc1847.txt.

European Search Report issued in corresponding European Patent Application No. EP 06 00 6322, dated Oct. 18, 2006.

* cited by examiner

FIG.4

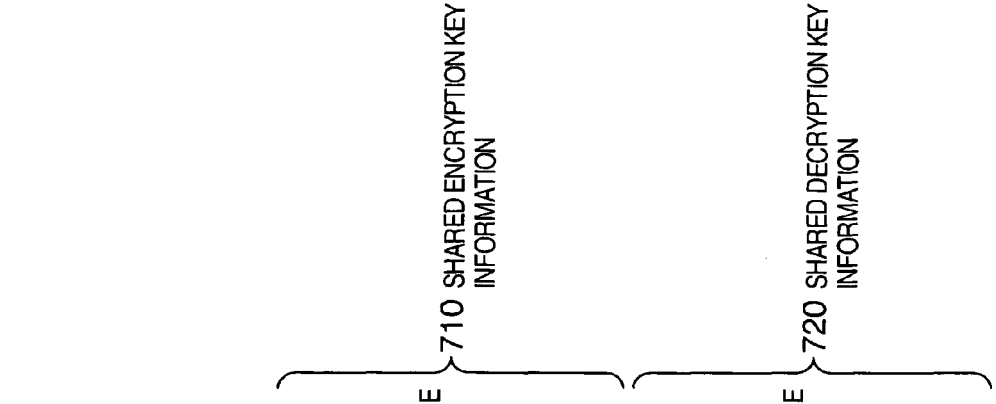

| Label | Value | Description |
|---|---|---|
| 70 | | SESSION INFORMATION |
| 701 | SESSION_N05 | SESSION ID |
| 702 | 0x00029049 | TRANSMISSION SEQUENCE NUMBER |
| 703 | 0x43099AF0 | RECEPTION SEQUENCE NUMBER |
| 704 | 10 Jan 2005 18:05:30 | RECEPTION TIME STAMP |
| 61 | USER1@SIPDOMAIN.JP | SIP IDENTIFIER |
| 711 | ENCRYPT_KEY_N02 | SHARED ENCRYPTION KEY ID |
| 712 | AES | ENCRYPTION ALGORITHM NAME |
| 713 | 0xEF937D2ABF03C939D03222EE932754F93 | ENCRYPTION KEY VALUE |
| 714 | HMAC-SHA1 | MESSAGE AUTHENTICATION ALGORITHM NAME |
| 715 | 0xD032D2ABFACDD54F93EF93793903C2EE | SECRET VALUE |
| 716 | 11 Jan 2005 00:00:00 | EXPIRATION TIME |
| 717 | 0xFFFFFFFF | MAXIMUM ENCRYPTION SIZE |
| 718 | 0xED589893 | CURRENT ENCRYPTION SIZE |
| 721 | DECRYPTE_KEY_N09 | SHARED DECRYPTION KEY ID |
| 722 | AES | DECRYPTION ALGORITHM NAME |
| 723 | 0xF9E32A7DBF03EE3C9A27D3C939D0322E | DECRYPTION KEY VALUE |
| 724 | HMAC-SHA1 | MESSAGE AUTHENTICATION ALGORITHM NAME |
| 725 | 0xF03EF93882D0E293E3C9A27DB3C6754F | SECRET VALUE |
| 726 | 11 Jan 2005 00:00:00 | EXPIRATION TIME |
| 727 | 0xFFFFFFFF | MAXIMUM DECRYPTION SIZE |
| 728 | 0xDF438908 | CURRENT DECRYPTION SIZE |

710 SHARED ENCRYPTION KEY INFORMATION (711–718)

720 SHARED DECRYPTION KEY INFORMATION (721–728)

FIG.7

| | | | |
|---|---|---|---|
| ENCRYPTED DATA (OF SHARED KEY ENCRYPTION MESSAGE TYPE) | HEADER FIELD | CONTENT TYPE HEADER FIELD | 50 / 500 / 5001 |
| | | CONTENT-LENGTH HEADER FIELD | 5002 |
| | | SESSION ID HEADER FIELD | 5003 |
| | | KEY ID HEADER FIELD | 5004 |
| | | DIGEST VALUE FIELD | 5005 |
| | BODY FIELD | | 510 / 512 |
| | | SHARED KEY ENCRYPTION MESSAGE BODY FIELD: | |
| | | ENCRYPTION ALGORITHM NAME FIELD | 5201 |
| | | MESSAGE AUTHENTICATION ALGORITHM NAME FIELD | 5202 |
| | | UPPER LAYER PROTOCOL DATA FIELD | 5203 |
| | | SEQUENCE NUMBER FIELD | 5204 |
| | | SESSION ID FIELD | 5205 |
| | | TRANSMISSION KEY INFORMATION FIELD | 5206 |
| | | RECEPTION KEY INFORMATION FIELD | 5207 |
| | | MESSAGE AUTHENTICATION VALUE FIELD | 5208 |

— # ENCRYPTION METHOD FOR SIP MESSAGE AND ENCRYPTED SIP COMMUNICATION SYSTEM

INCORPORATION BY REFERENCE

This application claims priority based on a Japanese patent application, No. 2005-090464 filed on Mar. 28, 2005, the entire contents of which are Incorporated herein by reference.

BACKGROUND

The present invention relates to an encryption method for SIP messages transferred among a plurality of entities such as servers and clients, and to an encryption SIP communication system.

SIP (Session Initiation Protocol) is widely used for establishment of communications (IP telephony and the like) between two entities (e.g., apparatus or processes to be embodied by running software on apparatus) (for the details of SIP, for example, refer to IETF, RFC3261 "SIP: Session Initiation Protocol", IETF, June 2002, URL: http://www.ietf.org/rfc/rfc3261.txt (called Document 1")

SIP has a mechanism that a server called a SIP server performs a communication establishment process on behalf of entities (hereinafter called SIP clients).

If a communication message (hereinafter called a SIP message) to be exchanged between SIP clients and a SIP server is tampered, the contents of the SIP message may be stolen or altered.

There is a method of protecting security and integrity of a SIP message by providing an encryption functional module between a SIP functional module for processing a SIP message and a communication functional module for communications between SIP clients and a SIP server, and by using an encryption communication protocol TLS (Transport Layer Security) and a message communication method S/MIME (Secure Multipurpose Internet Mail Extensions).

TLS is an encryption communication protocol widely used for protecting security and integrity of application data transferred in the WWW (World Wide Web) system (for the details of TLS, for example, refer to IETF, RFC2246 "The TLS Protocol Version. 1.0", IETF, January 1999, URL: http://www.ietf.org/rfc/rfc2246.txt (called Document 2)).

Prior to transmitting application data, TLS executes a protocol called Handshake Protocol to authenticate a communication partner from a public key certificate, to negotiate an encryption algorithm for encryption communications and the type and parameters of a hash function, and to calculate a cryptographic key to be used for encryption of the application data, from the negotiation results.

S/MIME is an encryption method to be used mainly for a digital signature and encryption of an e-mail (for the details of S/MIME, for example, refer to IETF, RFC1847 "Security Multiparts for MIME: Multipart/Signed and Multipart/Encrypted", IETF, October 1995, URL: http://www.ietf.org/rfc/rfc1847.txt (called Document 3)).

S/MIME makes a digital signature on application data by using a private key of a transmission source, and encrypts the application data with the digital signature by using random numbers. The encrypted application data and the random numbers encrypted by a public key of a communication destination are transmitted as one message (for the details of the format of encrypted data with the electronic signature, for example, refer to IETF, RFC3369 "Cryptographic Message Syntax (CMS)", August 2002, URL: http://www.ietf.org/rfc/rfc3369.txt (called Document 4)).

SUMMARY

Since TLS is designed on the assumption that TLS operates on the connection type protocol TCP, there is a possibility that TLS does not operate correctly on the connectionless type protocol UDP. It is also necessary to conduct negotiation for communication initiation. S/MIME is not required to conduct negotiation for communication initiation, and operates on the connectionless type protocol UDP. On the other hand, in order to protect security and integrity of a communication message, S/MIME is required to perform public key encryption for each of an encryption process, a decryption process, a digital signature process and a digital signature verification of a communication message.

Namely, conventional techniques are associated with a long process time, because negotiation of security parameters is necessary prior to communications or use of public key encryption is necessary for each transmission/reception process of a SIP message, in order to protect security and integration of the SIP message.

In SIP, a transmitter and receiver of a SIP message are identified by SIP identifiers called SIP-URI described in the SIP message. In TLS and S/MIME, a communication partner is identified by using a public key certificate.

Therefore, in order to protect a SIP message in TLS and S/MIME, the SIP identifiers are required to be written in the public key certificate, in order to guarantee that the communication partner identified by the public key certificate is identical to the transmitter of the SIP message identified by the SIP identifier. There arises an issue that a specific public key certificate written with the SIP identifiers is required to be used for the SIP communication system, because generally the SIP identifiers are not written in the public key certificate.

A main feature of the present invention resides in that when a message is transferred between two entities, encrypted data obtained by encrypting a communication message by shared information is transmitted if the shared information for encryption is shared by two entities, whereas if the shared information for encryption is not shared, the communication message is encrypted by a public key of a transmission destination entity and electronically signed by a private key of a transmission source entity to transmit the encrypted data.

Another main feature of the present invention resides in that the encrypted data contains the shared information to be used for the transmission destination entity of the encrypted data to encrypt and decrypt a message in communications after the encrypted data.

Still another main feature of the present invention resides in that a correspondence is managed between a public key certificate and a SIP identifier of the transmission source entity, the SIP identifier corresponding to the public key certificate added to the encrypted data is compared with a SIP identifier of a transmitter contained in a SIP message to confirm whether both the SIP identifiers are coincident.

It is advantageous in that even if the shared information for encryption is not shared, negotiations for sharing the shared information are not necessary and a time taken for transmission start can be shortened.

It is also advantageous in that if the shared information for encryption is shared, encryption and decryption processes for a communication message can be executed at high speed.

It is also advantageous in that a special public key certificate (public key certificate written with a SIP identifier) for SIP communications is not necessary.

BRIEF DESCRIPTION OF THE DRAWINGS

FIG. 4 is a diagram showing an example of the session information 70.

FIG. 5 is a diagram showing an example of the communication partner information 60.

FIG. 7 is a diagram showing an example of the format of the encrypted data 50 of a shared key encryption message type.

DETAILED DESCRIPTION OF THE EMBODIMENTS

Embodiments of the present invention will be described below. The present invention will not be limited by the embodiments.

Although applications to SIP will be described, the prevent invention can also be adopted for applications to protecting security and integrity of data in a communication protocol unnecessary for ensuring arrival of messages and in a communication protocol performing message retransmission.

First, description will be made on an encryption SIP communication system adopting the present invention.

Figure 6:
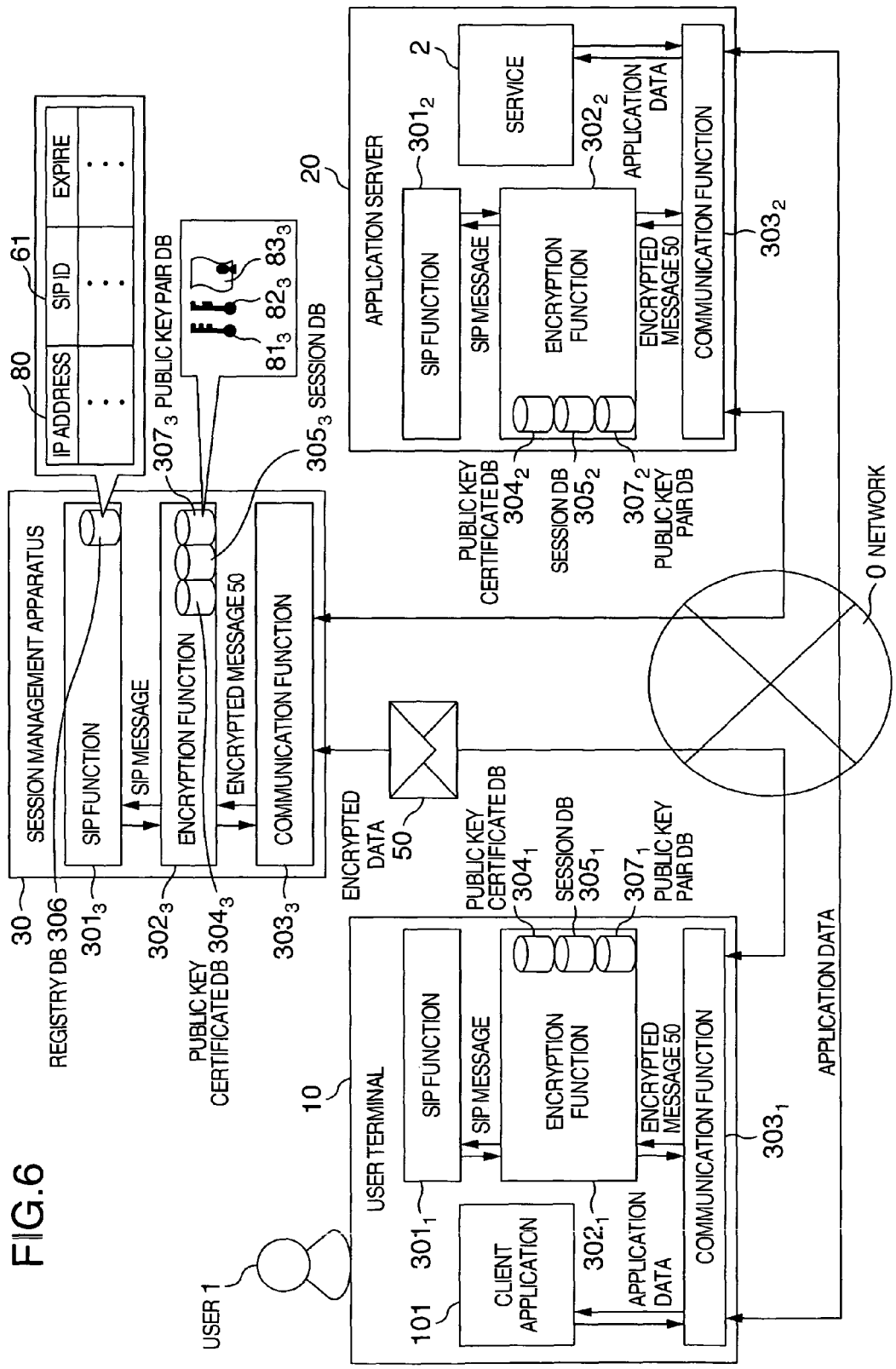
FIG. 6 is a diagram showing an example of the structure of the encryption SIP communication system according to the embodiment.

FIG. 6 is a diagram showing a first encryption SIP communication system adopting the present invention.

The system of the first embodiment is constituted of a user terminal 10 to be used by a user 1, an application server 20 for providing services 2, and a session management apparatus 30 for establishing/controlling communications between the user terminal 10 and application server 20 in SIP communications, respectively interconnected by a network 0.

Each of the user terminal 10, application server 20 and session management apparatus 30 is equipped with a SIP functional module 301, an encryption functional module 302, a communication functional module 303, a public key certificate DB 304 and a session DB 305.

(In the following, the SIP functional module 301 operating at the user terminal 10 is represented by a SIP functional module $301_1$, the SIP functional module 301 operating at the application server 20 is represented by a SIP functional module $301_2$, the SIP functional module 301 operating at the session management apparatus 30 is represented by a SIP functional module $301_3$, and etc.)

The SIP functional module 301 has a function of generating a SIP message in accordance with an instruction from a client application 101 and a service 2, and processing a SIP message received from the SIP functional module 301 of another apparatus via the encryption functional module 302.

The encryption functional module 302 has a function of creating an encrypted data 50 containing a SIP message from the SIP functional module 301 and transmitting the encrypted data 50 to a transmission destination encryption functional module 302 via the communication functional module 303, or extracting a SIP message from encrypted data 50 received from another encryption functional module 302 via the communication functional module 303 and passing the SIP message to the SIP functional module 301.

The communication functional module 303 has a function of transmitting data received from the client application 101, service 2, and encryption functional module 302 to the communication functional module 303 operating at another apparatus, via the network, or passing data received from the communication functional module 303 operating at another apparatus to the client application 101, service 2 and encryption functional module 302.

The public key certificate database DB 304 is a DB storing communication partner information 60 on a relation between a SIP identifier 61 and a public key certificate to be used by the encryption functional module 302 for processing the encrypted data 50, and is managed by the encryption functional module 302.

There is one piece of the communication partner information 60 for each communication partner. For example, in the embodiment, in order for the encryption functional module $302_3$ of the session management apparatus 30 to communicate with two encryption functional modules 302: the encryption functional module $302_1$ of the user terminal 10 and the encryption functional module $302_2$ of the application server 20, the public key certificate DB $304_3$ of the session management apparatus 30 stores two pieces of the communication partner information 60 of the user 1 and service 2.

FIG. 5 is a diagram showing an example of the communication partner information 60 storing a public key certificate 62 issued to a communication partner having a SIP identifier 61 of USER1@SIPDOMAIN.JP.

The session DB 305 is a DB storing session information 70 and is managed by the encryption functional module 302.

In the embodiment system, communications with a particular communication partner are managed as one session. The session information 70 stores secret key information and the like to be used for an encryption process and decryption process for the encrypted data 50 at a current time of a session. For this reason, there is one piece of the session information 70 stored in the session DB 305 for each communication partner. For example, in this embodiment, in order for the encryption functional module $302_3$ of the session management apparatus 30 to communicate with two encryption functional modules 302: the encryption functional module $302_1$ of the user terminal 10 and the encryption functional module $302_2$ of the application server 20, the session DB $305_3$ of the session management apparatus 30 stores two pieces of the session information 70.

FIG. 4 is a diagram showing an example of the session information 70.

The session information 70 is constituted of: a session ID 701 added to the encrypted data 50 to identify a communication partner; a transmission sequence number 702 added to the encrypted data 50 to guarantee that the encrypted data 50 transmitted to the communication partner is newer than the encrypted data transmitted in the past; a reception sequence number 703 added to the encrypted data 50 to confirm that the encrypted data 50 received from the communication partner is newer than the encrypted data received in the past; a reception time stamp 704 added to the received encrypted data 50; a SIP identifier 61 of a communication partner; a shared encryption key information 710 to be used for generating the encrypted data 50; and a shared decryption key information 720 to be used for processing the received encrypted data 50.

The shared encryption key information 710 is constituted of: a shared encryption key ID 711 for unanimously identifying the shared encryption key information 710 in the session information 70; an encryption algorithm name 712 for designating the encryption algorithm to be used in the shared encryption key information 710; an encryption key value 713 to be used for encryption in the shared encryption key information 710; a message authentication algorithm name 714 for designating a message authentication algorithm such as HMAC (Keyed-Hashing for Message Authentication) to be used in the shared encryption key information 710; a secret value 715 to be used for calculating message authentication information in the shared encryption key information 710; an expiration time 716 of the shared encryption key information 710; a maximum encryption size 717 for designating a total number of data allowed to be encrypted by using the shared encryption key information 710 in an octet unit; and a current encryption size 718 representative of a total sum (in an octet unit) of data encrypted until a current time by using the shared encryption key information 710.

The shared decryption key information 720 is constituted of: a shared decryption key ID 721 for uniquely identifying the shared decryption key information 720 in the session information 70; a decryption algorithm name 722 for designating the decryption algorithm to be used in the shared decryption key information 720; a decryption key value 723 to be used for decryption in the shared decryption key information 720; a message authentication algorithm name 724 for designating a message authentication algorithm to be used in the shared decryption key information 720; a secret value 725 to be used for calculating message authentication information in the shared decryption key information 720; an expiration time 726 of the shared decryption key information 720; a maximum decryption size 727 for designating a total number of data allowed to be decrypted by using the shared decryption key information 720 in an octet unit; and a current decryption size 728 representative of a total sum (in an octet unit) of data decrypted until a current time by using the shared decryption key information 720.

The contents of each information in the session information 70 are renewed by the encryption functional module 302 managing the session information 70 or upon a notice from the transmission partner encryption functional module 302.

The user terminal 10 has, in addition to the above described functions and DBs, the client application 101 for using the service 2 and a public key pair DB $307_1$.

The public key pair DB $307_1$ is a DB storing a private key $81_1$, a public key $82_1$, and a public key certificate $83_1$ to be issued to the user 1, and is managed by the encryption functional module $302_1$.

Similarly, the application server 20 has the service 2 to be provided to the user 1 and a public key pair DB $307_2$.

The public key pair DB $307_2$ is a DB storing a private key $81_2$, a public key $82_2$, and a public key certificate $83_2$ to be issued to the service 2, and is managed by the encryption functional module $302_2$.

The session management apparatus 30 has also a registry DB 306 and a public key pair DB $307_3$.

The public key pair DB $307_3$ is a DB storing a private key $81_3$, a public key $82_3$, and a public key certificate $83_3$ to be issued to the session management apparatus 30, and is managed by the encryption functional module $302_3$.

The registry DB 306 is a DB storing IP address information 80 including a relation between the SIP identifier 61 and the IP address of an apparatus having the SIP identifier 61 and operating the SIP functional module 301, and an expiration time of the relation, and is managed by the SIP functional module 301.

The structure of the encryption SIP communication system of the embodiment has been described above.

Figure 2:
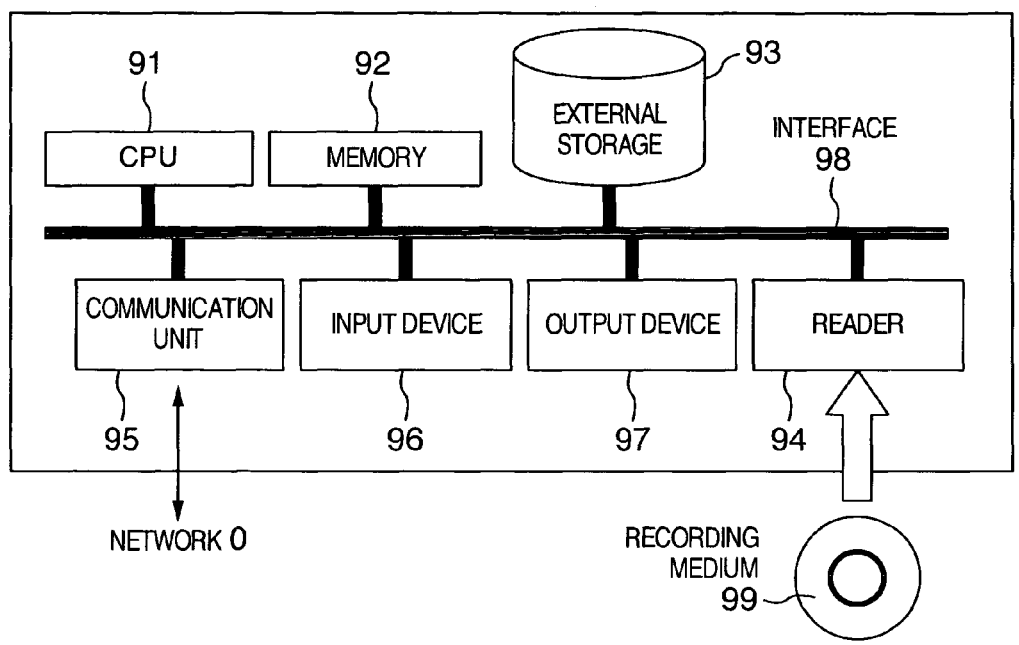
FIG. 2 is a diagram showing an example of the hardware structure of each of the user terminal 10, application server 20 and session management apparatus 30 shown in FIG. 6.

Each of the user terminal 10, application server 20 and session management apparatus 30 can be realized by a computer such as shown in FIG. 2. The computer has a CPU 91, a memory 92, an external storage 93 such as a hard disk, a reader 94 for reading information from a portable storage medium 99 such as a CD-ROM, a communication unit 95 for communicating with another apparatus via a network or a LAN, an input device 96 such as a keyboard and a mouse, an output device 97 such as a monitor and a printer, and an interface 98 for data transfer among these devices, wherein CPU 91 executes predetermined programs loaded in the memory 92.

Namely, the service 2, client application 101, SIP functional module 301, encryption functional module 302 and communication functional module 303 can be realized by the processes to be performed when CPU 91 executes predetermined programs.

The public key certificate DB 304, session DB 305 and registry DB 306 can be realized when CPU 91 uses the memory 92 and external storage 93.

Predetermined programs for realizing each apparatus may be introduced into the computer from the computer usable storage medium 99 via the reader 94, from a network 0 via the communication unit 96 or from another server via a computer usable communication medium such as carriers and digital signals transmitted over the network 0.

When the programs are introduced, the programs are stored once in the external storage 93 and then loaded in the memory 92 to be executed by CPU 91, or the programs may be loaded directly in the memory 92 without being stored in the external storage 93 to be executed by CPU 91.

Next, description will be made on the format of the encrypted data 50 to be transferred between the encryption functional modules 302 via the communication functional modules 303 in the encryption SIP system of the embodiment.

The format of the encrypted data 50 of the embodiment includes three types: a public key encryption message type, a shared key encryption message type and an error notify message type.

First, description will be made on the format of the encrypted data 50 of the public key encryption message type.

Figure 1:
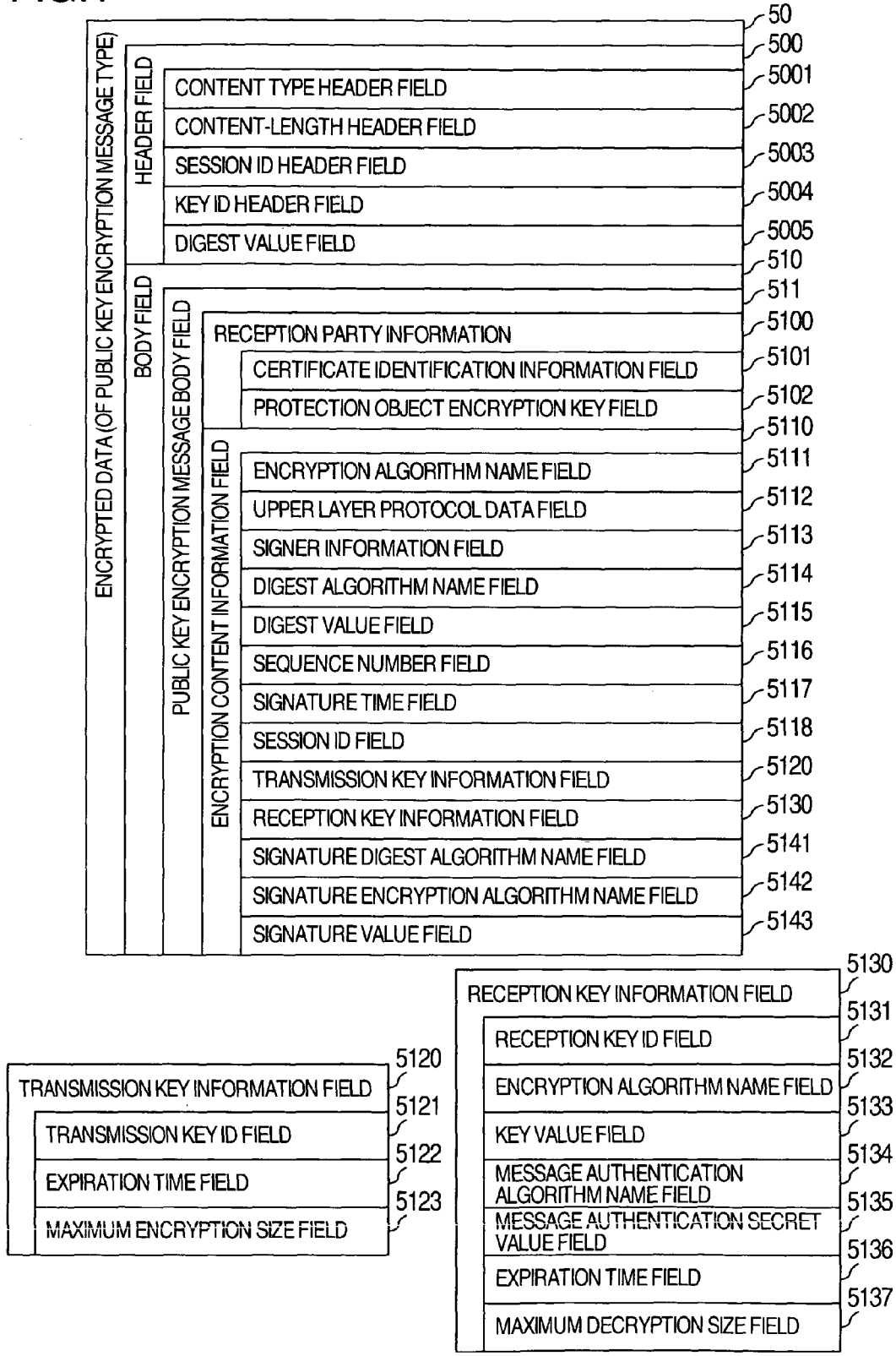
FIG. 1 is a diagram showing an example of the format of the encrypted data 50 of the public key encryption message type according to an embodiment.

FIG. 1 is a diagram showing the format of the encrypted data 50 of the public key encryption message type.

The encrypted data 50 of the public key encryption message type is constituted of a header field 500 and a body field 510.

The header field 500 is constituted of a content type header field 5001, a Content-Length header field 5002, a session ID header field 5003, a key ID header field 5004, and a digest value field 5005.

The body field 510 stores data of a public key encryption message body field 511.

The public key encryption message body field 511 is constituted of a reception party information field 5100 and an encryption content information field 5110.

The reception party information field 5100 is constituted of a certificate identification information field 5101 and a protection object encryption key field 5102.

The encryption content information field 5110 is constituted of: an encryption algorithm name field 5111; an upper layer protocol data field 5112; a signer information field 5113; a digest algorithm name field 5114; a digest value field 5115, a sequence number field 5116; a signature time field 5117; a session ID field 5118; a transmission key information field 5120; a reception key information field 5130; a signature digest algorithm name field 5141; a signature encryption algorithm name field 5142 and a signature value field 5143.

The transmission key information field 5120 is constituted of a transmission key ID field 5121, an expiration time field 5122 and a maximum encryption size field 5123.

The reception key information field 5130 is constituted of: a reception key ID field 5131; an encryption algorithm name field 5132; a key value field 5133; a message authentication algorithm name field 5134; a message authentication secret value field 5135; a value term field 5136 and a maximum decryption field 5137.

The format of the encrypted data 50 of the public key encryption message has been described above.

An EnvelopedData object defined in Document 4 may be used as the public key encryption message body field 511.

A SignedData object defined in Document 4 may be used for the upper layer protocol data field 5112 to signature value field 5143.

Next, description will be made on the format of the encrypted data 50 of the shared key encryption message type.

As shown in FIG. 7, the format of the encrypted data 50 of the shared key encryption message type is also constituted of a header field 500 and a body field 510.

The header field 500 is the same as the header field 500 of the public key encryption message type. The body field 510 has a shared key encryption message body field 512 in place of the public key encryption message body field 511.

The shared key encryption message body field 512 is constituted of: an encryption algorithm name field 5201; a message authentication algorithm name field 5202; an upper layer protocol data field 5203; a sequence number field 5204; a session ID field 5205; a transmission key field 5206; a reception key field 5207; and a message authentication value field 5208.

The details of the transmission key field 5206 are the same as those of the transmission key field 5120, and similarly the details of the reception key field 5207 are the same as those of the reception key field 5130.

The format of an EncryptedData object defined in Document 4 may be used as the public key encryption message body field 511. The format of an AuthenticatedData object defined in Document 5 may be used for the message authentication algorithm name field 5202 to message authentication value field 5208.

Next, description will be made on the format of the encrypted data 50 of the error notify message type.

Figure 14:
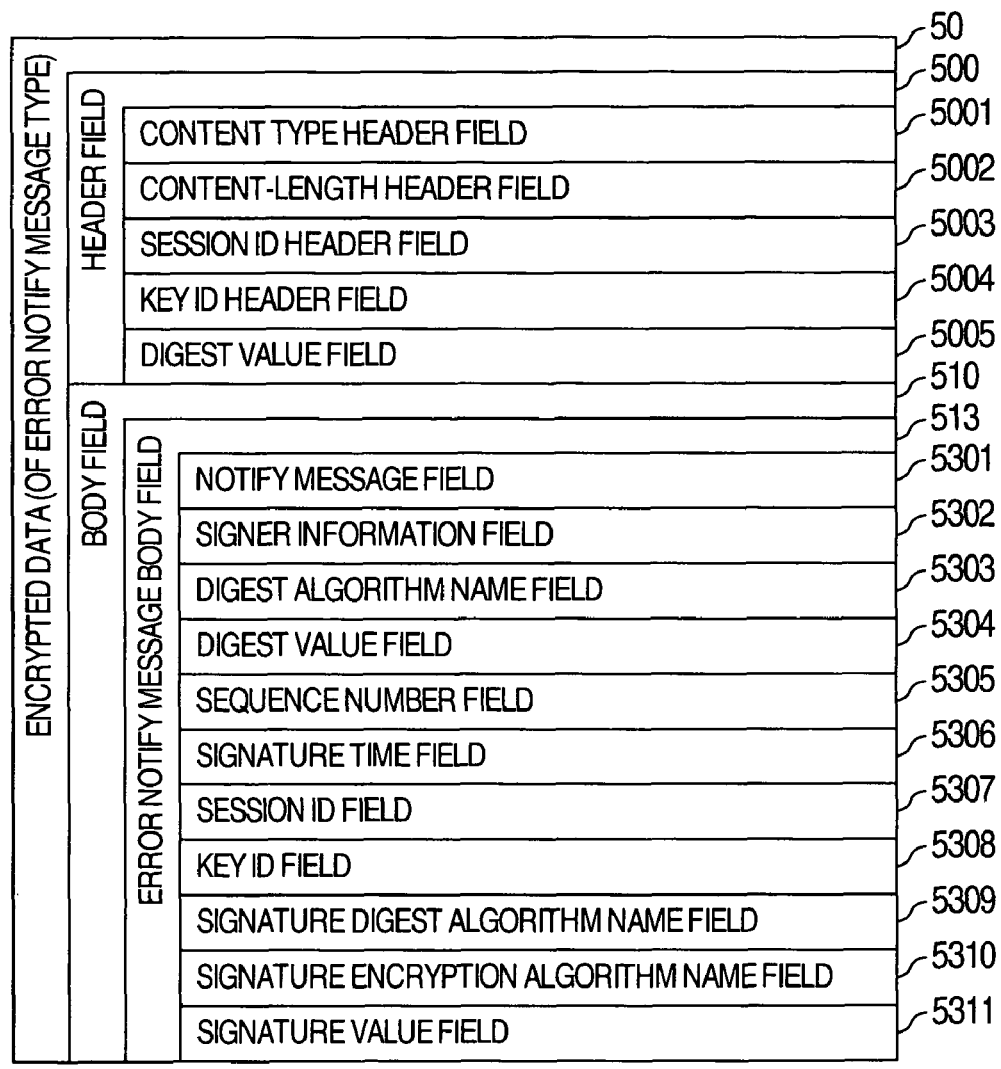
FIG. 14 is a diagram showing an example of the format of the encrypted data 50 of the error notify message type.

As shown in FIG. 14, the format of the encrypted data 50 of the error notify message type is also constituted of a header field 500 and a body field 510. The header field 500 is the same as the header field 500 of the public key encryption message type. The body field 510 has an error notify message body field 513 in place of the public key encryption message body 511.

The error notify message body field 513 is constituted of: a NOTIFY message field 5301; a signer information field 5302; a digest algorithm name field 5303; a digest value field 5304; a sequence number field 5305; a signature time field 5306; a session ID field 5307; a key ID field 5308; a signature digest algorithm name field 5309; a signature encryption algorithm name field 5310; and a signature value field 5311.

The format of a SignedData object defined in Document 4 may be used for the error notify message body 513.

Next, description will be made on an operation of the encryption SIP communication system of the embodiment.

The system of the first embodiment has four processes: a registration process, a communication establishment process, a communication termination process and a registration deletion process.

Figure 3:
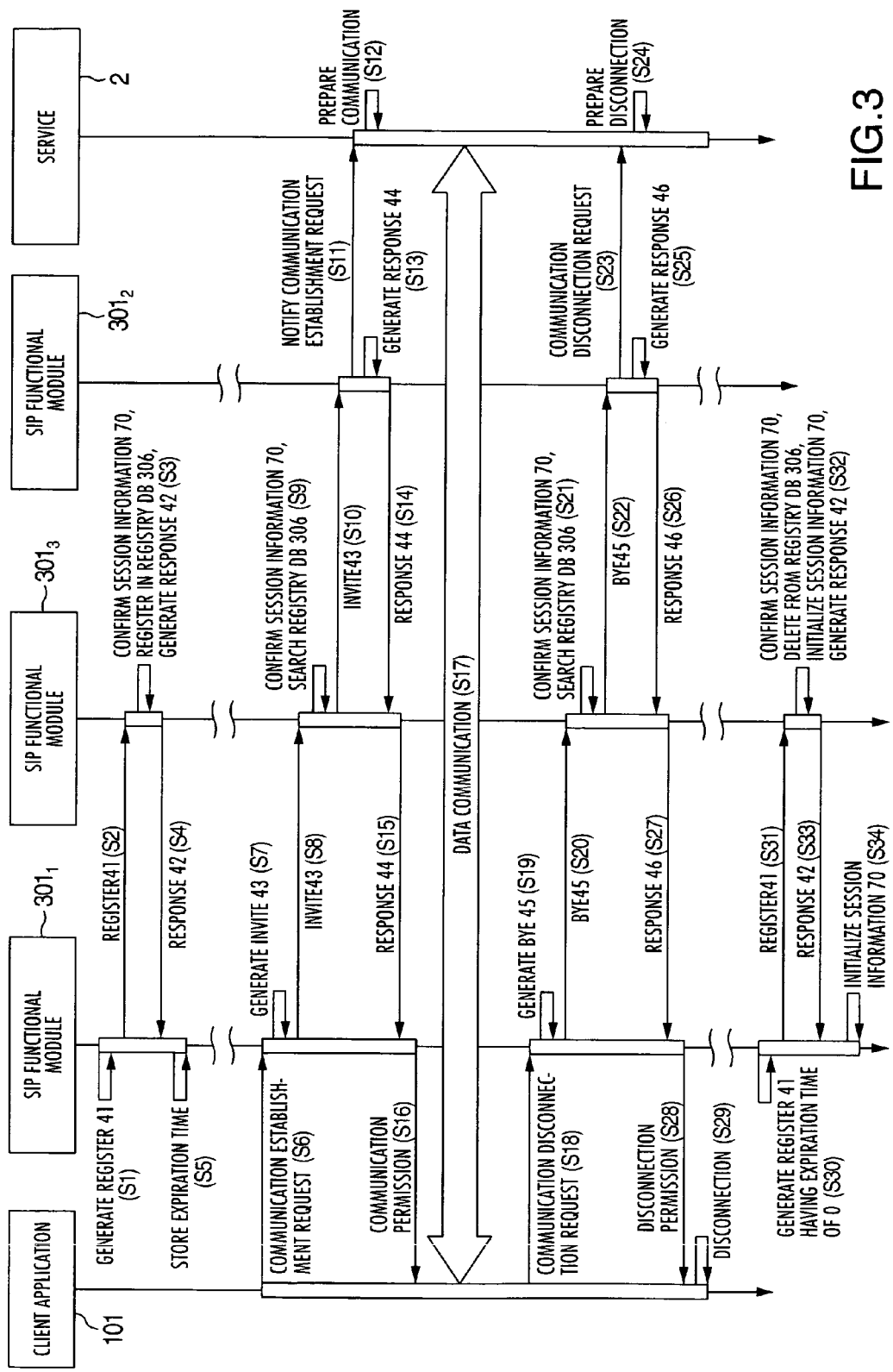
FIG. 3 is a diagram showing an example of an operation sequence of functions of the client application 101, service 2 and SIP functional module 301.

FIG. 3 is a diagram showing the outline of an operation sequence among functions of the client application 101, service 2 and SIP functional module 301 in the four processes of the system of the first embodiment.

First, description will be made on an operation of the SIP functional module 301 in the registration process of the system of the first embodiment, wherein the user terminal 10 registers a relation between the SIP identifier 61 of the user 1 and the IP address of the user terminal 10 in the session management apparatus 30.

In the registration process, the SIP functional module $301_1$ generates a SIP message (REGISTER message 41) containing information on a relation between the SIP identifier 61 of the user 1 and the IP address of the user terminal 10 and information on an expiration time of the relation (S1), and transmits the SIP message to the SIP functional module $301_3$ via the encryption functional module $302_1$ and encryption functional module $302_3$ (S2).

Upon reception of the REGISTER message 41, the SIP functional module $301_3$ confirms whether the SIP identifier 61 described in the session information 70 notified from the encryption functional module $302_3$ is coincident with the SIP identifier 61 of the sender of the REGISTER message 41 (S3).

If the SIP identifiers 61 are coincident with each other, the REGISTER message 41 is processed to register, as one entry, the SIP identifier 61 of the user 1, the IP address of the user terminal 10 and the expiration time contained in the REGISTER message 41, in the registry DB 306 (S3).

In this case, the SIP functional module $301_3$ may set an expiration time different from the expiration time contained in the REGISTER message 41 and register the different expiration time in the registry DB 306.

If it is confirmed at S3 that the SIP identifiers 61 are not coincident with each other, the SIP functional module $301_3$ judges that the REGISTER message 41 is an unauthorized message, and terminates the process.

Next, the SIP functional module $301_3$ generates a SIP message (response message 42) containing a response to the REGISTER message 41 (S3), and transmits the response message 42 to the SIP functional module $301_1$ via the encryption functional module $302_3$ and encryption functional module $302_1$ (S4).

If registration in the registry DB 306 succeeds, the response message 42 contains information on a status code notifying a success of the process for the REGISTER message 41 and information on the expiration time registered in the registry DB 306. If registration in the registry DB 306 fails, the response message 42 contains a status code notifying a failure of the process for the REGISTER message 41.

Upon reception of the response message 42 via the encryption functional module $302_3$ and encryption functional module $302_1$, the SIP functional module $301_1$ confirms the status code in the response message 42, and if the status code notifies a process success, stores information on the expiration time contained in the response message 42 (S5).

The operation of the SIP functional module 301 in the user terminal 10 and session management apparatus 30 has been described above.

The SIP functional module $301_3$ confirms repetitively (e.g., periodically) the contents of the registry DB 306, and if there is an entry having a lapsed expiration time in the registry DB 306, the entry is deleted.

The SIP functional module $301_3$ confirms repetitively (e.g., periodically) the contents of the registry DB 306, and if the expiration time expires, the above-described registration operation is performed again to register in the registry DB 306 the entry describing the relation between the SIP identifier 61 of the user 1 and the IP address of the user terminal 10.

With operations similar to the operations described above, the application server 20 registers, in the registry DB 306 of the session management apparatus 30, a relation between the SIP identifier 61 of the service 2 and the IP address of the application server 20.

Next, description will be made on the operation of the application client 101, service 2 and SIP functional module 301 to be executed when the communication establishment process is performed between the application client 101 and service 2 in the system of the first embodiment.

The communication establishment process starts when the application client 101 requests for communication establishment of the service 2 to the SIP functional module $301_1$ (S6).

Upon request for the communication establishment, the SIP functional module $301_1$ generates a SIP message (INVITE message 43) containing the SIP identifier 61 of the user 1 as a transmission source and the SIP identifier 61 of the service 2 as a transmission destination (S7), and transmits the INVITE message 43 to the SIP function unit $301_3$ via the encryption functional module $302_1$ (S8).

Upon reception of the INVITE message 43 via the encryption functional module $302_1$ and encryption functional module $302_3$, the SIP functional module $301_3$ confirms whether the SIP identifier 61 described in the session information 70 notified from the encryption functional module $302_3$ is coincident with the SIP identifier 61 of the sender of the INVITE message 43 (S9). If the SIP identifiers 61 are coincident with each other, the INVITE message 43 is processed to confirm the transmission destination of the INVITE message 43.

If it is confirmed at S9 that the SIP identifiers 61 are not coincident with each other, the SIP functional module $301_3$ judges that the INVITE message 43 is an unauthorized message, and terminates the process.

Next, the SIP functional module $301_3$ searches the IP address of the application server 20 operating the service 2 as the transmission destination of the INVITE message 43, from the registry DB 306 (S9), and transmits the INVITE message 43 to the SIP functional module $301_2$ via the encryption functional module $302_3$ and encryption functional module $302_2$ (S10).

Upon reception of the INVITE message 43, the SIP functional module $301_2$ notifies the service 2 of the communication establishment request (S11), generates a SIP message (response message 44) containing a response to the INVITE message 43 (S13), and transmits the response message 44 to the SIP functional module $301_3$ via the encryption functional module $302_2$ (S14).

The service 2 prepares communication start upon reception of the notice indicating the communication establishment request from the SIP functional module $301_2$ (S12).

If the SIP functional module $301_2$ permits communication, the response message 44 contains a status code indicating a process success of the INVITE message 43. If the SIP functional module $301_2$ does not permit communication, the response message 44 contains a status code indicating a process failure of the INVITE message 43.

Upon reception of the response message 44 via the encryption functional module $302_2$ and encryption functional module $302_3$, the SIP functional module $301_3$ transmits the response message 44 to the SIP functional module $301_1$ via the encryption functional module $302_3$ and encryption functional module $302_1$ (S15).

Upon reception of the response message 44, the SIP functional module $301_1$ confirms the status code of the response message 44. If the status code indicates a process success of the INVITE message 43, the SIP functional module $301_1$ notifies the client application 101 of that the service 2 permits communication (S16).

Upon reception of the communication permission notice from the SIP functional module $301_1$, the client application 101 establishes a connection to the service 2 and starts communication (S17).

The operation for communication establishment between the application client 101 and service 2 has been described above.

For communication establishment, the service 2 may request for communication establishment to the SIP functional module $301_2$ in the manner opposite to that described above. In this case, the SIP functional module $301_2$ generates an INVITE message 43 containing the SIP identifier 61 of the service 2 as a transmission source and the SIP identifier 61 of the user 1 as a transmission destination, and transmits the INVITE message 43 to the session management apparatus 30.

Next, description will be made on the operation of the client application 101, service 2 and SIP functional module 301 to be executed when the communication termination process is performed between the application client 101 and service 2 in the system of the first embodiment.

The communication termination process starts when the client application 101 requests for communication disconnection to the SIP functional module $301_1$ (S18).

Upon request for the communication disconnection, the SIP functional module $301_1$ generates a SIP message (BYE message 45) containing the SIP identifier 61 of the user 1 as a transmission source and the SIP identifier 61 of the service 2 as a transmission destination (S19), and transmits the BYE message 45 to the SIP function unit $301_3$ via the encryption functional module $302_1$ and encryption functional module $302_3$ (S20).

Upon reception of the BYE message 45 via the encryption functional module $302_1$ and encryption functional module $302_3$, the SIP functional module $301_3$ confirms whether the SIP identifier 61 described in the session information 70 notified from the encryption functional module $302_3$ is coincident with the SIP identifier 61 of the sender of the BYE message 45 (S21). If the SIP identifiers 61 are coincident with each other, the transmission destination of the BYE message 45 is confirmed (S21).

If it is confirmed at S21 that the SIP identifiers 61 are not coincident with each other, the SIP functional module $301_3$ judges that the BYE message 45 is an unauthorized message, and terminates the process.

Next, the SIP functional module $301_3$ searches the IP address of the application server 20 operating the service 2 as the transmission destination of the BYE message 45, from the registry DB 306 (S21) The SIP functional module $301_3$ transmits the BYE message 45 to the SIP functional module $301_2$ via the encryption functional module $302_3$ and encryption functional module $302_2$ (S22).

Upon reception of the BYE message 45, the SIP functional module $301_2$ notifies the service 2 of the communication disconnection request (S23), and the service 2 prepares communication disconnection (S24).

Next, the SIP functional module $301_2$ generates a SIP message (response message 46) containing a response to the BYE message 46 (S25), and transmits the response message 46 to the SIP functional module $301_3$ via the encryption functional module $302_2$ and encryption functional module $302_3$ (S26).

If the SIP functional module $301_2$ permits disconnection, the response message 46 contains a status code indicating a process success of the BYE message 45. If the SIP functional module $301_2$ does not permit disconnection, the response message 46 contains a status code indicating a process failure of the BYE message 43.

Upon reception of the response message 46, the SIP functional module $301_3$ transmits the response message 46 to the SIP functional module $301_1$ via the encryption functional module $302_3$ and encryption functional module $302_1$ (S27).

Upon reception of the response message 46, the SIP functional module $301_1$ confirms the status code of the response message 46. If the status code indicates a process success of the BYE message 45, the SIP functional module $301_1$ notifies the client application 101 of that the service 2 permits communication termination (S28).

Upon reception of the communication disconnection permission notice from the SIP functional module $301_1$, the client application 101 disconnects a connection to the service 2 and terminates the communication (S29).

The operation for communication termination between the application client 101 and service 2 has been described above.

For communication termination, the service 2 may request for communication termination to the SIP functional module $301_2$ in the manner opposite to that described above. In this case, the SIP functional module $301_2$ generates a BYE message 45 containing the SIP identifier 61 of the service 2 as a transmission source and the SIP identifier 61 of the user 1 as a transmission destination, and transmits the BYE message 45 to the session management apparatus 30.

Next, description will be made on the operation of the SIP functional unit 301 in the registration deletion process of the system of the first embodiment.

Description will be made on an operation to be performed when the user terminal 10 deletes the relation between the SIP identifier 61 of the user 1 and the IP address of the user terminal 10 registered in the session management apparatus 30.

This deletion process starts when the SIP functional module $301_1$ generates a REGISTER message 41 having an expiration time of 0 (S30).

The SIP functional module $301_1$ transmits the REGISTER message 41 to the SIP functional module $301_3$ via the encryption functional module $302_1$ and encryption functional module $302_3$ (S31).

Upon reception of the REGISTER message 41, the SIP functional module $301_3$ confirms whether the SIP identifier 61 described in the session information 70 notified from the encryption functional module $302_3$ is coincident with the SIP identifier 61 of the sender of the REGISTER message 41 (S32).

If the SIP identifiers 61 are coincident with each other, the REGISTER message 41 is processed to delete the entry describing the SIP identifier 61 of the user 1 contained in the REGISTER message 41, from the registry DB 36.

If it is confirmed at S32 that the SIP identifiers 61 are not coincident with each other, the SIP functional module $301_3$ judges that the REGISTER message 41 is an unauthorized message, and terminates the process.

Next, the SIP functional module $301_3$ generates a response message 42 to the REGISTER message 41 (S32), transmits the response message 42 to the SIP functional module $301_1$ via the encryption functional module $302_3$ and encryption functional module $302_1$, and instructs the encryption functional module $302_3$ to initialize the session information 70 (S33).

Upon reception of the response message 42, the SIP functional module $301_1$ deletes the stored expiration time information and instructs the encryption functional module $302_1$ to initialize the session information 70.

The operation of the session management apparatus 30, user terminal 10 and SIP functional module 301 has been described above.

With similar operations, the application server 20 deletes the relation between the SIP identifier 61 of the service 2 and the IP address of the application server 20.

Next, description will be made on the operation of the encryption functional module 302 of the system of the first embodiment.

First, when the system of the embodiment starts, the encryption functional module 302 initializes all session information 70 in the session DB 305 in the following manner.

First, a character string "NO_SESSION" is set to the session ID 701, 0 is set to the transmission sequence number 702, 0 is set to the reception sequence number 703, a character string "NOT_RECEIVED" is set to the reception time stamp 704, a SIP identifier 61 of a communication partner for the session information 70 is set to the SIP identifier 61.

Next, the shared encryption key information 710 is initialized. Namely, a character string "NO_KEY" is set to the shared encryption key ID 711, a character string "NULL" is set to the encryption algorithm name 712, 0 is set to the encryption key value 713, a character string "NULL" is set to the message authentication algorithm name 714, 0 is set to the secret value 715, a character string representative of a current time is set to the expiration time 716, 0 is set the maximum encryption size 717, and 0 is set to the current encryption size 718.

Next, the shared decryption key information 720 is initialized. Namely, a character string "NO_KEY" is set to the shared decryption key ID 721, a character string "NULL" is set to the decryption algorithm name 722, 0 is set to the decryption key value 723, a character string "NULL" is set to the message authentication algorithm name 724, 0 is set to the secret value 725, a character string representative of a current time is set to the expiration time 726, 0 is set the maximum decryption size 727, and 0 is set to the current decryption size 728.

Next, when all session information 70 is initialized completely, the encryption functional module 302 notifies the SIP functional module 301 and communication functional module 303 of an initialization operation completion.

The operation of the encryption functional module 302 to be executed when the system of the embodiment is initialized has been described above.

Next, description will be made on the operation of the encryption functional module 302 to be executed when the SIP functional module 301 passes a SIP message to the encryption functional module 302 to transfer the SIP message between the SIP functional modules 301 shown in FIG. 3.

Figure 8:
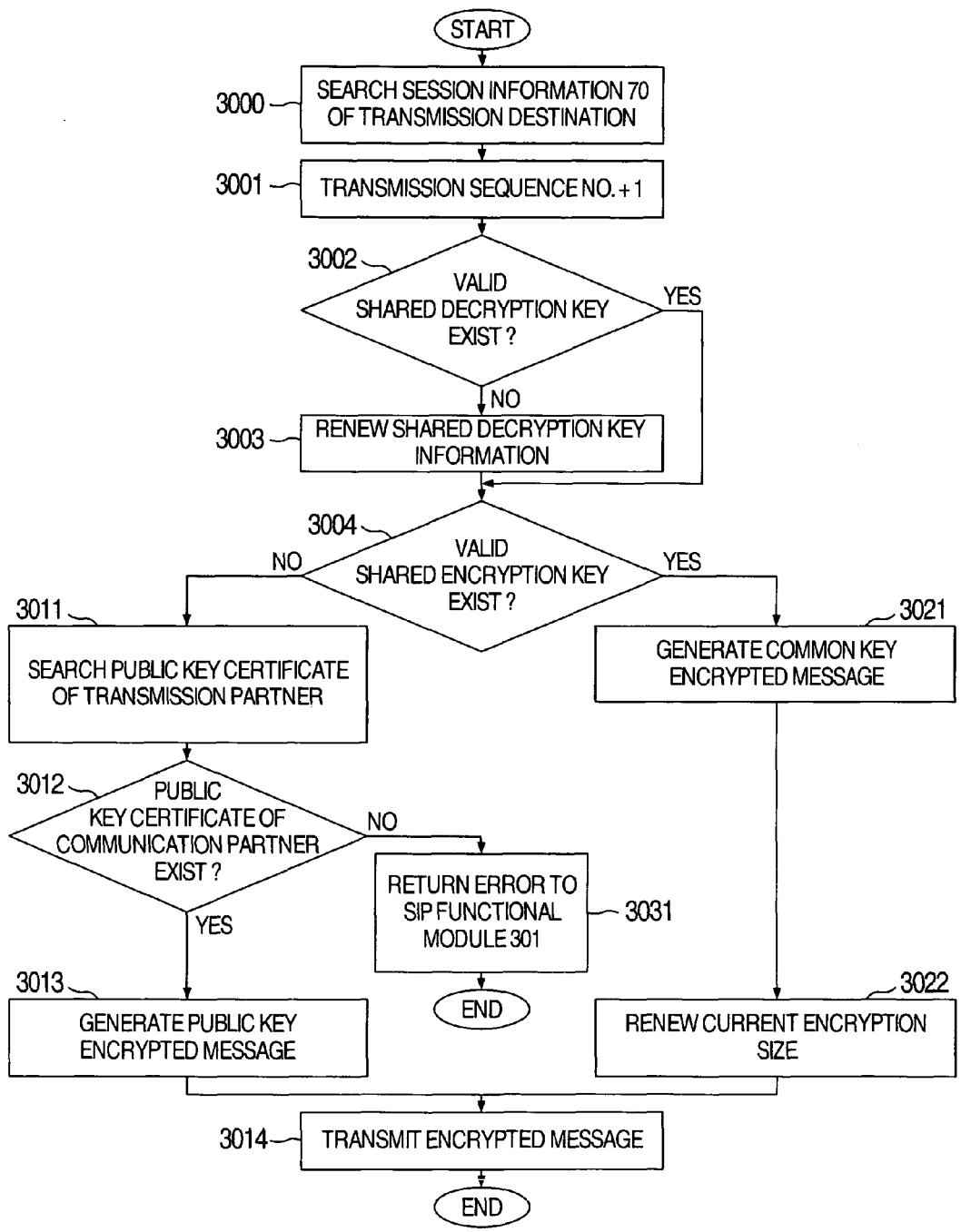
FIG. 8 is a flow chart illustrating the operation of the encryption functional module 302 encrypting a SIP message.

FIG. 8 is a flow chart illustrating the operation of the encryption functional module 302 to be executed when a SIP message is received from the SIP functional module 301 and the SIP message is encrypted.

Upon reception of a SIP message from the SIP functional module 301, the encryption functional module 302 confirms a transmission destination of the SIP message and acquires the session information 70 including the SIP identifier 61 of the transmission destination from the session DB 305 (Step 3000).

Next, the transmission sequence number 702 of the session information 70 is incremented by 1 (Step 3001).

Next, it is confirmed whether the shared decryption key information 720 of the session information 70 is valid (Step 3002). That the shared decryption key information 720 is valid means that the expiration time 726 is later than the current time and the current decryption size 728 is smaller than the maximum decryption size 727.

If it is judged that the shared decryption key information 720 is valid (Yes at Step 3002), the flow advances to Step 3004.

If it is judged that the shared decryption key information 720 is not valid (No at Step 3002), then the shared decryption key information 720 is renewed (Step 3003). Namely, random numbers are set to the shared decryption key ID 721, shared decryption key value 723 and secret value 725. At the same time, 0 is set to the maximum decryption size 728 and an empty character string is set to the expiration time 726. The name of a usable shared key encryption algorithm is set to the encryption algorithm name 722, and the name of a usable message authentication algorithm is set to the message authentication algorithm name 724.

Next, the encryption functional module 302 confirms whether the valishared dencryption keyshared encryption key information 710 exists (Step 3004). That the shared encryption key information 710 is valid means that the expiration time 716 is later than the current time and the current encryption size 718 is smaller than the maximum encryption size 717. In this embodiment, since the shared encryption key information 710 is notified from the communication partner, if the shared encryption key information 710 is valid, it is judged that the shared encryption key information 710 of the valid session information 70 is being shared with the transmission partner.

If it is judged that the valid shared encryption key information 710 exists (No at Step 3004), the flow advances to Step 3021.

If it is judged that the shared encryption key information 710 is not valid (No at Step 3004), the encryption functional module 302 acquires the communication partner information 60 including the SIP identifier 61 of the transmission destination from the public key certificate DB 304 (Step 3011) to thereafter advance to Step 3012.

If the communication partner information 60 including the SIP identifier 61 of the transmission destination does not exist (No at Step 3012), the encryption functional module 302 notifies the SIP functional module 301 of an error to thereafter terminate the process (Step 3031).

If the communication partner information 60 exists (Yes at Step 3012), the public key certificate 62 of the transmission destination is acquired from the communication partner information 60 to generate the encrypted data 50 of the public key encryption message type (Step 3013).

Description will be made on the operation of the encryption functional module 302 which generates the encrypted data 50 of the public key encryption message type at Step 3013.

First, the encryption functional module 302 sets the SIP message received from the SIP functional module 301 to the upper layer protocol data field 5112.

Next, the encryption functional module 302 sets the public key certificate 83 to the signer information field 5113.

Next, the digest value of the SIP message is set to the digest value field 5115, and the name of the algorithm used for calculating the digest value is set to the digest algorithm name field 5114.

Next, the transmission sequence number 702 is set to the sequence number field 5116.

Next, a current time is set to the signature time field 5141, and the session ID 701 is set to the session ID field 5118.

Next, the shared encryption key ID 711 is set to the transmission key ID field 5121, the expiration time 716 is set to the expiration time field 511, and the maximum encryption size 717 is set to the maximum encryption size field 5123.

Next, the shared decryption key ID 721 is set to the reception key ID field 5131, the encryption algorithm name 722 is set to the encryption algorithm name field 5132, the decryption key value 723 is set to the key value field 5133, the message authentication algorithm name 724 is set the message authentication algorithm name field 5134, the secret value 725 is set to the message authentication secret value field 5135, the expiration time 726 is set to the expiration time field 5136, and the maximum decryption size 727 is set to the maximum decryption size field 5137.

Next, the encryption functional module 302 calculates the signature digest value by using a set of sequence data in the digest value field 5115 to reception key information field 5130, and the name of the digest algorithm used for calculation is set to the signature digest algorithm name field 5141.

The signature value is generated by encrypting the signature digest value by the private key 81 and set to the signature value field 5143. The name of a public key algorithm used for encryption is set to the signature encryption algorithm name field 5142.

Next, the encryption functional module 302 generates random numbers and encrypts the upper layer protocol data field 5112 to signature value field 5143 by the random numbers, and the name of an encryption algorithm used for encryption is set to the encryption algorithm name field 5111.

Next, the encryption functional module 302 sets the public key certificate 62 of the transmission destination to the certificate identification information field 5101, and the value obtained by encrypting the random numbers by the public key contained in the public key certificate 62 to the protection object encryption key field 5102.

The encryption functional module 302 sets a character string "START" to the content type header field 5001 in order to indicate that the encrypted data 50 is of the public key encryption message type. A length of the body field 510 is set to the Content-Length header field 5002. The session ID 701 of the session information 70 is set to the session ID header field 5003. Nothing is set to the key ID header field 5004. A digest value of the body field 510 and identification information on the digest algorithm used for calculating the digest value are set to the digest value field 5005.

The operation of the encryption functional module 302 to be executed when the encrypted data 50 of the public key encryption message type is generated has been described above.

The encryption functional module 302 generated the encrypted data 50 in the manner described above instructs the communication functional module 303 to transmit the encrypted data 50 (Step 3014) to thereafter terminate the process.

If it is judged at Step 3004 that the shared encryption key information 710 is valid, the encryption functional module 302 generates the encrypted data 50 of the SIP message at Step 3021 in accordance with the shared key encryption message format 52.

Description will be made on the operation of the encryption functional module 302 to be executed when the encrypted data 50 of the shared key encryption message type is generated.

First, the encryption functional module 302 sets the encryption algorithm name 712 to the encryption algorithm name field 5201, the message authentication algorithm name 714 to the message authentication algorithm name field 5202, a SIP message received from the SIP functional module 301 to the upper layer protocol data field 5203, and the session ID 701 to the session ID field 5205.

Next, a value is set to the transmission key field 5206, similar to the case of the transmission key field 5120.

Next, a value is set to the reception key field 5207, similar to the case of the reception key field 5130.

Next, by using an algorithm having the message authentication algorithm name 714 and the secret value 715, a message authentication value is calculated by using a set of sequence data in the upper layer protocol data field 5203 to reception key information field 5207, and stored in the message authentication value field 5208.

The encryption functional module 302 sets a character string "CONTINUE" to the content type header field 5001 in order to indicate that the encrypted data 50 is of the shared key encryption message type. A length of the body field 510 is set to the Content-Length header field 5002. The session ID 701 is set to the session ID header field 5003. The shared encryption key ID 711 is set to the key ID header field 5004. A digest value of the body field 510 and identification information on the digest algorithm used for calculating the digest value are set to the digest value field 5005.

The operation of the encryption functional module 302 to be executed when the encrypted data 50 of the shared key encryption message type is generated has been described above.

The encryption functional module 302 generated the encrypted data 50 adds a size of the message authentication algorithm name field 5202 to message authentication value field 5209 considered as a set of sequence data to the current encryption size 718 (Step 3022), and then executes the process at Step 3014 and subsequent processes.

The operation of the encryption functional module 302 received a SIP message from the SIP functional module 301 has been described above.

Next, description will be made on the operation of the encryption functional module 302 received encrypted data 50 via the communication functional module 303 when a SIP message is transferred between the SIP functional modules 301 shown in FIG. 3.

Figure 9:
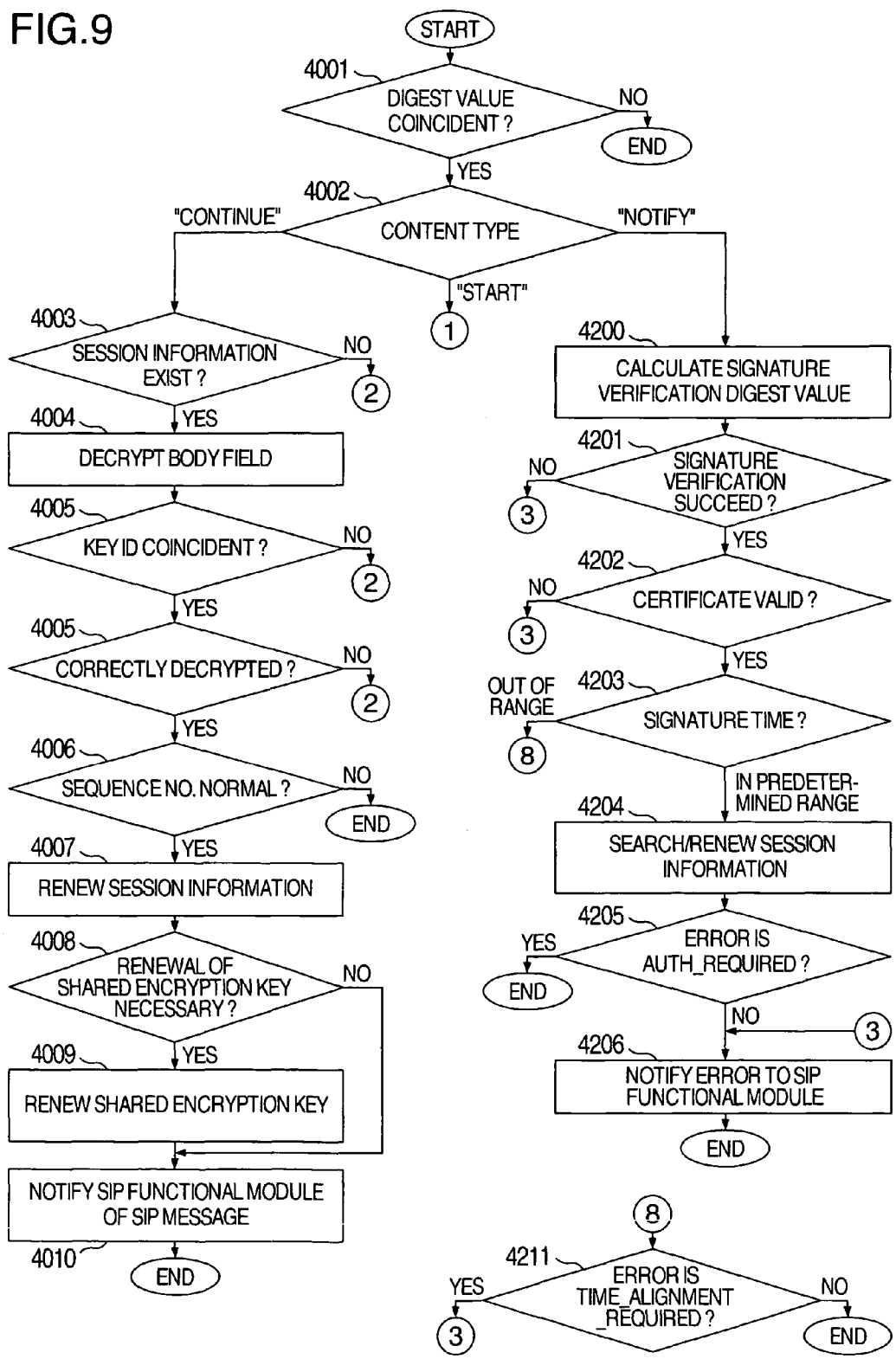
FIG. 9 is a first flow chart illustrating the operation of the encryption functional module 302 receiving the encrypted data 50 via the communication functional module 303.
Figure 10:
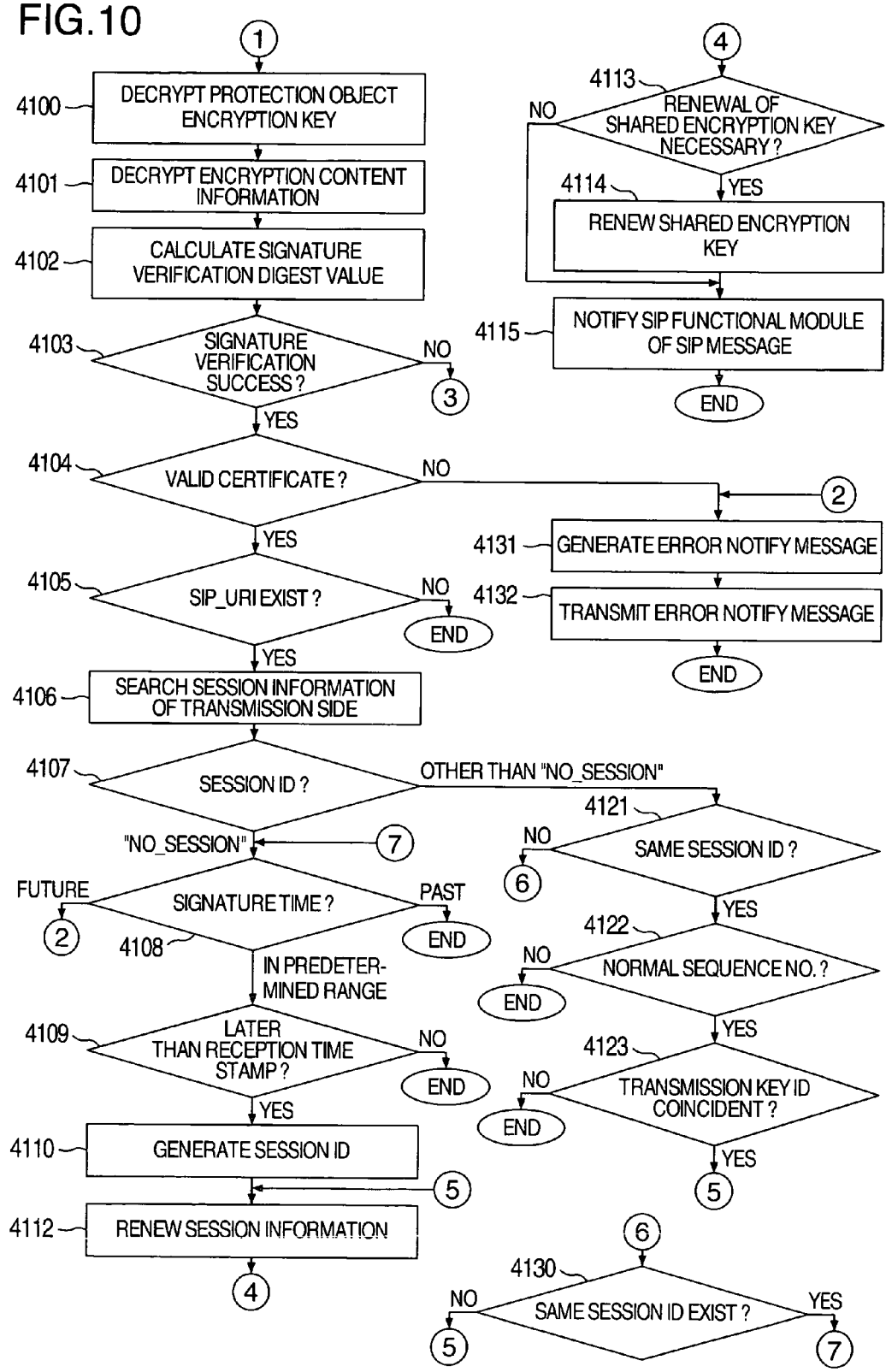
FIG. 10 is a second flow chart illustrating the operation of the encryption functional module 302 receiving the encrypted data 50 via the communication functional module 303.

FIGS. 9 and 10 are flow charts illustrating the operation of the encryption functional module 302 when the encrypted data 50 is received via the communication functional module 303.

First, upon reception of the encrypted data 50 from the communication functional module 303, the encryption functional module 302 calculates the digest value of the body field 510 and confirms whether the calculated digest value is coincident with the digest value stored in the digest value field 5005 (Step 4001).

If the digest values are not coincident with each other (No at Step 4001), it is judged that a transmission error occurred, and the process is terminated.

If the digest values are coincident with each other (Yes at Step 4001), the content header field 5001 of the encrypted data 50 is confirmed at Step 4002. If the value of the content header filed 5001 is "START", the encryption functional module 302 judges that the encrypted data 50 is of the public key encryption message type, and executes the process shown in FIG. 10.

First, the encryption functional module 302 decrypts the value in the protection object encryption key field 5102 by the public key 82 to acquire the protection object encryption key (Step 4100).

Next, at Step 4101, the data from the upper layer protocol data field 5112 to signature value field 5143 are decrypted by using the protection object encryption key.

The encryption functional module 302 calculates a signature verification digest value by using a set of sequence data in the digest value field 5115 to reception key information field 5130 (Step 4102).

It is confirmed whether a value obtained by decrypting the value in the signature value field 5114 by the public key of the public key certificate 62 stored in the signer information field 5113 is coincident with the signature verification digest value, and whether the value in the digest value field 5115 is coincident with the digest value obtained by calculating the value in the upper layer protocol data field 5112 by an algorithm designated by the digest algorithm name field 5114 (Step 4103).

If No at Step 4103, i.e., one of two confirmations fails, it is judged that the signature verification failed, i.e., that the encrypted data 50 was altered data, and the SIP functional module 301 is notified an error occurrence to thereafter terminate the process (Step 4206).

If Yes at Step 4103, i.e., two confirmations succeed, then it is verified whether the public key certificate 62 stored in the signer information field 5113 is valid (Step 4104).

If it is judged that the public key certificate 62 is not valid (No at Step 4104), the encrypted data 50 of the error notify message type is generated in order to notify the transmission source of a certificate verification error (Step 4131).

More detailed description will be made on the operation of the encryption functional module 302 to be executed when the encrypted data 50 of the error notify message type is generated to notify the certificate verification failure.

First, the encryption functional module 302 sets a pair of a character string "AUTH_FAILURE" and public key certificate 62 to the NOTIFY message field 5301 to notify that verification of the public key certificate 62, i.e., authentication of the transmission partner, failed.

Next, the encryption functional module 302 sets its public key certificate to the signer information field 5302.

Next, the digest value in the NOTIFY message field 5301 is set to the digest value field 5304, and the name of an algorithm used for calculating the digest value is set to the digest algorithm name field 5303.

Next, the transmission sequence number 702 is set to the sequence number field 5305.

Next, a current time is set to the signature time field 5306, and the session ID 701 is set to the session ID field 5307.

Next, the encryption functional module 302 sets an empty character string to the key ID field 5308.

Next, the encryption functional module 302 calculates a signature digest value by using a set of sequence data in the digest value field 5304 to key ID field 5308, and sets the name of a digest algorithm used for calculation to the signature digest algorithm name field 5309.

Further, a signature value obtained by encrypting the signature digest value by its own private key is set to the signature value field 5311, and the name of a public key algorithm used for encryption is set to the signature algorithm name field 5310.

Further, the encryption functional module 302 stores a character string "NOTIFY" in the content type header field 5001 in order to indicate that the encrypted data 50 is of the error notify message type. A length of the body field 510 is stored in the Content-Length header field 5002. The session ID 701 of the session information 70 is set to the session ID header field 5003. Nothing is set to the key ID header field 5004. The digest value of the body field 510 and identification information on the digest algorithm used for calculating the digest value are set to the digest value field 5005.

The detailed operation of the encryption functional module 302 to be executed when the encrypted data 50 of the error notify message type is generated to notify a certificate verification failure has been described.

The encryption functional module 302 generated the encrypted data 50 of the error notify message type transmits the encrypted data 50 to the communication partner via the communication functional module 303 (Step 4132).

If it is judged at Step 4104 that the public key certificated 62 is valid (Yes at Step 4104), the public key certificate DB 304 is searched to check whether the SIP identifier 61 corresponding to the public key certificate 62 stored in the signer information field 5113 exists (Step 4105).

If the SIP identifier 61 does not exist in the public key certificate DB 304 (No at Step 4105), the process is terminated.

If the SIP identifier 61 exists in the public key certificate DB 304 (Yes at Step 4105), the session information 70 corresponding to the SIP identifier 61 is searched from the session DB 305 (Step 4106).

Next, the encryption functional module 302 confirms the value in the session ID field 5118 (Step 4107).

If it is confirmed at Step 4107 that the value in the session ID field is "NO_SESSION", the encryption functional module 302 confirms whether the value in the signature time field 5306 is in a predetermined range from a current time (Step 4108).

If it is judged at Step 4108 that the signature time is older than the predetermined range from the current time, it is judged that the old message was received, to thereafter terminate the process.

If it is judged at Step 4108 that the signature time is later than the predetermined range from the current time, the encryption functional module 302 judges that synchronization is necessary with the time of the communication partner, generates at Step 4131 the encrypted data 50 of the error notify message type to request for time synchronization, and sends back the encrypted data to the communication partner via the communication functional module 303 (Step 4132).

The encrypted data 50 of the error notify message type for requesting for time synchronization is the same as the encrypted data 50 of the error notify message type notifying the certificate verification failure, excepting that a character string of "TIME_ALIGNMENT_REQUIRED" is stored in the NOTIFY message field 5301.

If it is judged at Step 4108 that the signature time in the predetermined range from the current time, the encryption functional module 302 confirms whether the value in the signature time field 5306 is later than the reception time stamp 704 (Step 4109).

If the value in the signature time field 5306 is not later than the reception time stamp 704 (No at Step 4109), it is judged that an old message was received, and the process is terminated.

If the value in the signature time field 5306 is later than the reception time stamp 704 (Yes at Step 4109), the encryption functional module 302 generate a new session ID different from all session information 70 stored in the session DB 305 (Step 4110).

Next, the encryption functional module 302 renews the reception sequence number 703 to the value in the sequence number field 5116, the reception time stamp 704 to the value in the signature time field 5306, the expiration time 726 to the value in the expiration time field 5122, and the maximum decryption size 727 to the value in the maximum encryption size field 5123 (Step 4112).

If the new session ID is generated at Step 4110, the encryption functional module 302 renews the session ID 701 to the new session ID, and in other cases, the session ID 701 is renewed to the value in the session ID Field 5118.

Next, the encryption functional module 302 compares the value in the reception key ID field 5131 with the shared encryption key ID 711 to confirm whether the values are coincident with each other (Step 4113).

If the values are coincident (No at Step 4113), since it is not necessary to renew the common key, a process at Step 4115 is executed.

If the values are not coincident (Yes at Step 4113), the shared key is required to be renewed, and at Step 4114 the encryption algorithm 712 is renewed to the value in the encryption algorithm name field 5132, the encryption key value 713 is renewed to the value in the key value field 5133, the message authentication algorithm name field 714 is renewed to the value in the message authentication algorithm name field 5134, and the secret value 715 is renewed to the value in the message authentication secret value field 5135. A predetermined term is added to the current time to calculate an expire time and set the result to the expiration time 716, and a predetermined size is set to the maximum encryption size 717.

Next, the encryption functional module 302 notifies the SIP functional module 301 of the value in the upper layer protocol data field 5112 by using a SIP message (Step 4115), to thereafter terminate the process.

In this case, the encryption functional module 302 notifies the SIP functional module 301 of the SIP message and the session information 70. If it is judged at Step 4107 that the value.in the session ID field 5118 is different from "NO-SESSION", the encryption functional module 302 checks whether the value in the session ID Field 5118 is identical to the session ID 701 of the session information 70 searched at Step 4106 (Step 4121).

If the values are identical, the encryption functional module 302 executes the process at Step 4122 and subsequent processes.

Namely, the encryption functional module 302 confirms whether the value in the sequence number field 5116 is normal (e.g., larger than the reception sequence number 703) (Step 4122).

If the value in the sequence number field 5116 is not normal (e.g., not larger than the reception sequence number 703 (No at Step 4122), it is judged that an old message was received, an the process is terminated.

If the value in the sequence number field 5116 is normal at Step 4122 (e.g., larger than the reception sequence number 703 (Yes at Step 4122), the encryption functional module 302 compares the transmission key ID field 5231 with the shared decryption key ID 722 to confirm whether both values are coincident (Step 4123). If both values are not coincident (No at Step 4123), the process is terminated. If Yes at Step 4123, the process at Step 4112 and subsequent processes are executed.

If both values are not coincident at Step 4121, the encryption functional module 302 searches the session DB 307 to conform whether there is still the session information 70 having the same session ID 701 (Step 4130).

If it is judged at Step 4130 that the session information 70 exists, the encryption functional module 302 judges that it is necessary to confirm the signature time and generate a new session ID, and executes the process at Step 4108 and subsequent processes.

If it is judged at Step 4130 that the session information 70 does not exist, the encryption functional module 302 executes the process at Step 4112 and subsequent processes.

The operation to be executed when it is judged at Step 4002 that the encrypted data 50 is of the public key encryption message type has been described above.

If the value of the content header field 5001 is "CONTINUE" at Step 4002 shown in FIG. 9, the encryption functional module 302 judges that the encrypted data 50 is of the shared key encryption message type, and executes the following process.

First, the encryption functional module 302 searches the session information 70 having the same session ID 701 as the value in the session ID header field 5003, from the session DB 305 (Step 4003).

If the session information 70 does not exist, the encryption functional module 302 judges that it is necessary to authenticate the communication partner again, generates the encrypted data 50 of the error notify message type at Step 4131 shown in FIG. 10, and returns the encrypted data to the communication partner via the communication functional module 303 (Step 4132) to thereafter terminate the process.

The encrypted data 50 of the error notify message type requesting for authentication is the same as the encrypted data 50 of the error notify message type notifying a certificate verification error, excepting that a character string of "AUTH_REQUIRED" is stored in the notify message field 5301, the value of the session ID header field 5003 of the public key encryption message type is set to the session ID header field 5003 and session ID field 5307, and the value in the key ID field 5004 of the public key encryption message type is set to the key ID header field 5004 and key ID field 5308.

If the session information 70 exists at Step 4003, it is confirmed whether the value in the key ID header field 5004 is coincident with the shared decryption key ID 721 stored in the session information (Step 4004).

If the values are coincident with each other, the encryption functional module 302 judges that it is necessary to authenticate the communication partner again, generates the encrypted data 50 of the error notify message type requesting for authentication at Step 4131 shown in FIG. 10, and returns the encrypted data to the communication partner via the communication functional module 303 (Step 4132) to thereafter terminate the process.

If the values are coincident at Step 4004, the body field is decrypted by the decryption key value 723 to confirm whether the body field is decrypted correctly (Step 4005).

If the body field cannot be decrypted correctly, the encryption functional module 302 judges that it is necessary to authenticate the communication partner again, generates the encrypted data 50 of the error notify message type requesting authentication at Step 4131, and returns the encrypted data to the communication partner via the communication functional module 303 (Step 4132) to thereafter terminate the process.

If the body field is correctly decrypted at Step 4005, it is confirmed whether the value in the sequence number field 5204 is larger than the reception sequence umber 703 (Step 4006).

If the value in the sequence number field 5204 is not larger, it is judged that an old message was received to thereafter terminate the process.

If the value in the sequence number field 5204 is larger at Step 4006, the session information 70 is renewed at Step 4007.

Namely, the value in the sequence number field 5204 is set to the reception sequence number 703, the value in the expiration time field 5122 is set to the expiration time 726 of the shared decryption key information 720, the value in the maximum encryption size field 5123 is set to the maximum decryption size 727, the size of the message authentication algorithm name field 5202 to message authentication value field 5209 considered as a set of sequence data is added to the current decryption size 728.

Next, the encryption functional module 302 confirms whether the value in the reception key ID field 5131 is the same as the shared encryption key ID 711 (Step 4008).

If the value is the same as the shared encryption key ID 711, it is judged that renewal of the shared encryption key ID information 710 is unnecessary, and Step 4010 is executed.

If the value is different from the shared encryption key ID 711 at Step 4008, it is judged that renewal of the shared encryption key ID information 710 is necessary, and the session information 70 is renewed.

Namely, the encryption algorithm 712 is renewed to the value in the encryption algorithm name field 5132, the encryption key value 713 is renewed to the value in the key value field 5133, the message authentication algorithm name field 714 is renewed to the value in the message authentication algorithm name field 5134, and the secret value 715 is renewed to the value in the message authentication secret value field 5135. At the same time, a predetermined term is added to the current time to calculate an expire time and set the result to the expiration time 716, and a predetermined size is set to the maximum encryption size 717.

Next, at Step 4010 the encryption functional module 302 notifies the SIP functional module 301 of the value in the upper layer protocol field 5112 as a SIP message to thereafter terminate the process.

In this case, the encryption functional module 302 notifies the SIP functional module 301 of the SIP message together with the session information 70. The operation to be executed when it is judged at Step 4002 that the encrypted data 50 is of the shared key encryption message type has been described above.

If the value of the content header field 5001 is "NOTIFY" at Step 4002, the encryption functional module 302 judges that the encrypted data 50 is of the error notify message type, and executes the following process.

First, the encryption functional module 302 calculates a signature verification digest value by using the digest value field 5304 to key ID field 5308 as a set of sequence data (Step 4200).

Next, it is confirmed whether the signature verification digest value is coincident with a value obtained by decrypting the value in the signature value field 5311 by the public key of the public key certificate 62 stored in the signer information field 5302, and whether the value in the digest value field 5304 is coincident with the digest value obtained by calculating the value in the NOTIFY message field 5301 by an algorithm designated by the digest algorithm name field 5303 (Step 4201).

If one of two confirmations fails, it is judged that the signature verification failed, i.e., that the message was altered data, and the SIP functional module 301 is notified an error occurrence to thereafter terminate the process (Step 4206).

If two confirmations succeed, then it is verified whether the public key certificate 62 is valid (Step 4202).

If it is judged that the public key certificate 62 is not valid, it is judged that there is a possibility of an altered message, and the SIP functional module 301 is notified an error occurrence to thereafter terminate the process (Step 4206).

If the public key certificate 62 is valid, it is confirmed whether the value in the signature time field 5306 is in a predetermined range from the current time (Step 4203).

If the value in the signature time field 5306 is out of the predetermined range, it is confirmed whether the value in the NOTIFY message field 5301 is "TIME_ALIGNMENT_REQUIRED" (Step 4211).

If the value in the NOTIFY message field 5301 is different from "TIME_ALIGNMENT_REQUIRED", it is judged that an old message was received to thereafter terminate the process.

If the value in the NOTIFY message field 5301 is "TIME_ALIGNMENT_REQUIRED" at Step 4211, the SIP functional module 301 is notified an error that time is not synchronized (Step 4206) to thereafter terminate the process.

If the value in the signature time field 5306 is in the predetermined range from the current time at Step 4203, the SIP identifier 61 corresponding to the public key certificate 62 stored in the signer information field 511 is searched from the public key certificate DB 304, to renew the shared encryption key information 710 and shared decryption key information 720 in the session information 70 corresponding to the SIP identifier 61, to the initial state (Step 4204).

Next, at Step 4205 the encryption functional module 302 confirms the value in the NOTIFY message field 5301.

If the value in the NOTIFY message field 5301 is "AUTH_REQUIRED", the process is terminated.

If the value in the NOTIFY message field 5301 is not "AUTH_REQUIRED", an error occurrence is notified to terminate the process (Step 4206).

The operation to be executed when the encrypted data 50 is of the error notify message type at Step 4002 has been described above.

The operation of the encryption functional module 302 to be executed when the encrypted data 50 is received via the communication functional module 303 has been described.

In the system of this embodiment, if the encryption common information is being shared, the encrypted data 50 of the shared key encryption message type is used and verification of a digital signature and certificate is not necessary. Data to be transferred among apparatuses can therefore be processed at high speed.

If the encryption shared information is not being shared, the encrypted data 50 of the public key encryption message type is used so that communications can start without prior negotiations.

Further, in the system of the embodiment, the reception side of the encrypted data 50 of the shared key encryption message type generates and notifies beforehand the shared information (shared encryption key information 710) for generating the encrypted data 50. Accordingly, by confirming that the shared encryption key information 710 which is valid to the session information 70 exists, it is possible to judge that the shared encryption key information is being shared.

Furthermore, in the system of the embodiment, the shared encryption key information 710 is generated by the reception side of the encrypted data 50 and the expiration time 716 of the shared encryption key information 710 and the maximum encryption size 718 are determined and notified by the transmission side of the encrypted data 50. Accordingly, even if the transmission side notifies the shared encryption key information 710 containing an encryption algorithm and key having a weak security performance, the security performance can be improved by shortening the expiration time and reducing the allowable encryption size.

In this embodiment, although the SIP identifier 61, public key certificates 62 and 83 are issued to the user 1, service 2 and session management apparatus 30, the present invention is not limited thereto. For example, the SIP identifier 61, public key certificates 62 and 83 may be issued to the user terminal 10 and application server 20, or to a provider of the service 2.

In this embodiment, although the public key certificate DB 304 exists in the encryption functional module 302, the present invention is not limited thereto. For example, the public key certificate DB 304 may be disposed in a database apparatus and accessed via a LAN or the network 0.

Further, in this embodiment, although a character string of an algorithm name is stored as the encryption algorithm name 712, message authentication algorithm name 714, encryption algorithm name 722 and message authentication algorithm name 724, the present invention is not limited thereto. For example, information capable of being uniquely identified such as OID may also be stored.

Similarly, although a character string of an expire time of the shared encryption key information 710 (shared decryption key information 720) is stored as the expiration time 716 (expiration time 726), the present invention is not limited thereto. For example, a numerical value representative of a lapse time from a certain time may be stored.

Further, although character strings of expire times of the shared encryption key information 710 and shared decryption key information 720. are stored in the corresponding expiration time field 5122 and expiration time field 5136, the present invention is not limited thereto. For example, a different time between the expire time and a current time may be calculated and stored when the expiration time field 5122 and expiration time field 5136 are set.

In this case, the reception side encryption functional module 302 may calculate the expire time by adding a value in the expiration time field 5122 or expiration time field 5136 to the current time.

Further, although the session DB 305 exists in the encryption functional module 302, the present invention is not limited thereto. -For example, the session DB 305 may be disposed in a database apparatus and accessed via a LAN or the network 0.

Further, in this embodiment, although the registry DB 306 exists in the SIP functional module 301, the present invention is not limited thereto. For example, the registry DB 306 may be disposed in a database apparatus and accessed via a LAN or the network 0.

Further, in the present invention, although the encrypted data 50 of the error notify message type for notifying a verification failure of the public key certificate sets a pair of a character string of "AUTH_FAILURE" and the public key certificate 62 to the NOTIFY message field 5301, the present invention is not limited thereto. For example, a digest value of the public key certificates may be set instead of the public key certificate 62.

Furthermore, in this embodiment, although a time generated by the encrypted data 50 of the error notify message type for requesting time synchronization is set to the signature time field 5306, the present invention is not limited thereto. For example, a value in the signature time field 5306 of the encrypted data 50 of the public key encryption message for which field the encrypted data was generated may be set to the signature time field 5306.

Further, in this embodiment, although the session information 70 has only one piece of the-shared encryption key information 710, the present invention is not limited thereto. For example, a plurality of pieces of the shared encryption key information 710 may be managed as a list.

Further, in the present invention, although the session information 70 has only one piece of the shared encryption key information 720, the present invention is not limited thereto. For example, a plurality of pieces of the shared encryption key information 720 may be managed as a list.

Next, a second encryption SIP communication system embodying the present invention will be described.

The system structure of the second embodiment is similar to that of the first embodiment.

In the second embodiment, however, when the SIP functional module 301 transmits the REGISTER message 41, the encrypted data 50 of the public key encryption message type is generated by all means, and when the SIP function module 302 transmits the SIP message (e.g., INVITE message 43) other than the REGISTER message 41, the encrypted data 50 of the public key encryption message type is generated by all means.

Therefore, the encryption functional module 302 is newly provided with a function of renewing the session information 70 stored in the session DB 305, and the SIP functional module 301 is provided with a function of instructing the encryption functional module 302 to update the session information 70.

Further, the encryption functional module $302_3$ of the session management apparatus 30 has a function of generating not only the shared decryption key information 720 but also the shared encryption key information 710.

A function of generating the shared decryption key information 720 is deleted from the encryption functional module $302_1$ of the user terminal 10 and the encryption functional module $302_2$ of the application server 20.

Next, description will be made on each functional module of the second embodiment.

Figure 11:
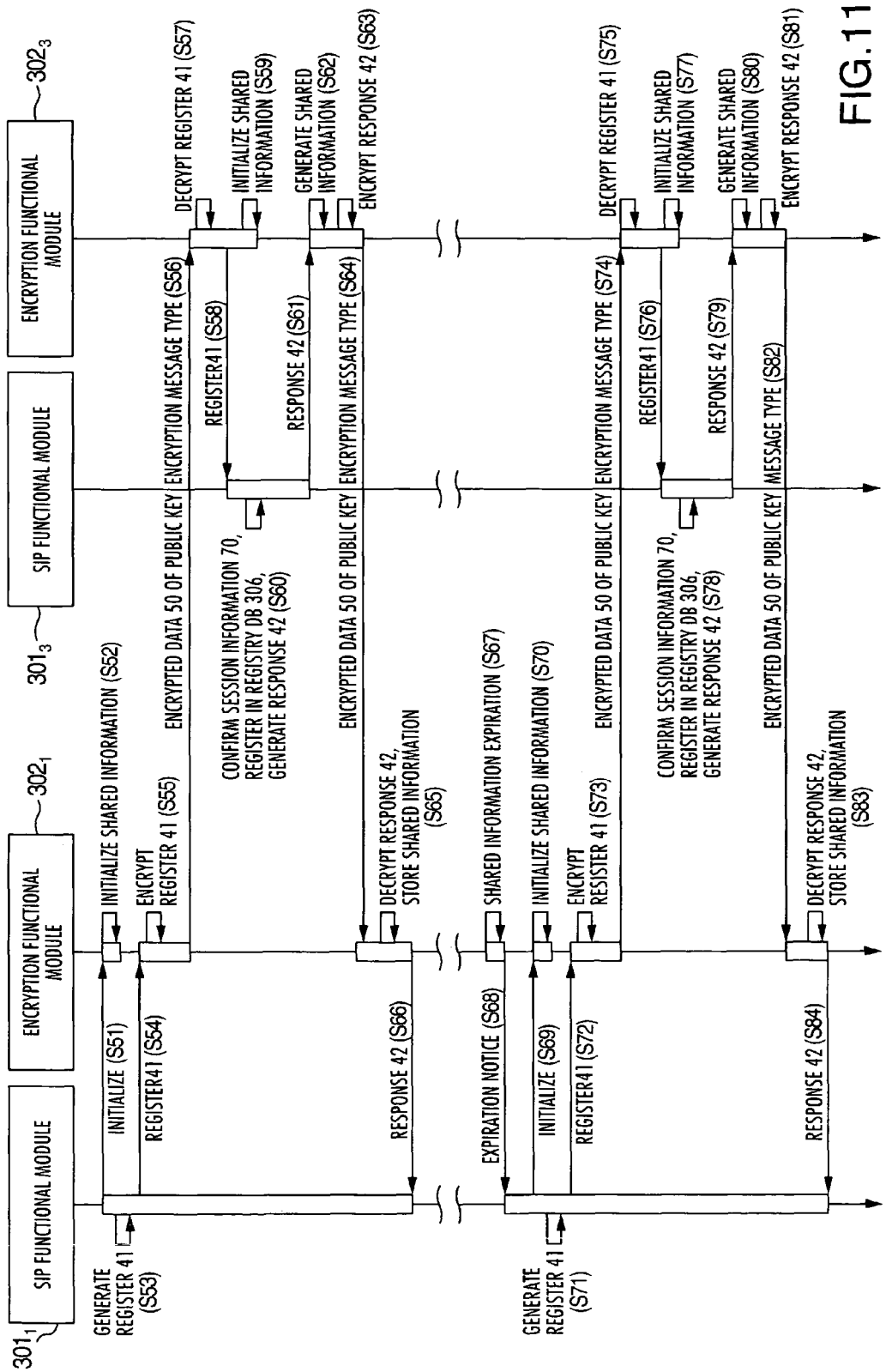
FIG. 11 is a diagram illustrating the operation sequence to be executed when a relation between the SIP identifier 61 of the user 1 and the IP address of the user terminal 10 is registered in the session management apparatus 30 and when the shared encryption key information 710 or shared decryption key information 720 expires, according to the second embodiment.

FIG. 11 is a diagram illustrating the operation sequence of the SIP functional module 301 and encryption functional module 302 to be executed when the user terminal 10 registers the relation between the SIP identifier 61 of the user 1 and the IP address of the user terminal 10 in the session management apparatus 30 and when the shared encryption key information 710 or shared decryption key information 720 in the session information 70 of the session management apparatus 30 managed by the session DB $305_1$ is expired, according to the second embodiment.

First, description will be made on the operation to be executed when the user terminal 10 registers the relation between the SIP identifier 61 of the user 1 and the IP address of the user terminal 10 in the session management apparatus 30, according to the second embodiment.

In this embodiment, first the SIP functional module $301_1$ instructs the encryption functional module $302_1$ to initialize the session information 70 corresponding to the session management apparatus 30 (S51).

The encryption functional module $302_1$ received the instruction from the SIP functional unit $301_1$ searches the session information 70 corresponding to the session management apparatus 30 from the session DB $305_1$, and initializes the shared encryption key information 710 and shared decryption key information 720 of the session information 70 (S52).

Next, the SIP functional module $301_1$ generates the REGISTER message 41 (S53) and transmits the REGISTER message 41 to the SIP functional module $301_3$ via the encryption functional module $302_1$ and encryption functional module $302_3$ (S54).

Figure 13:
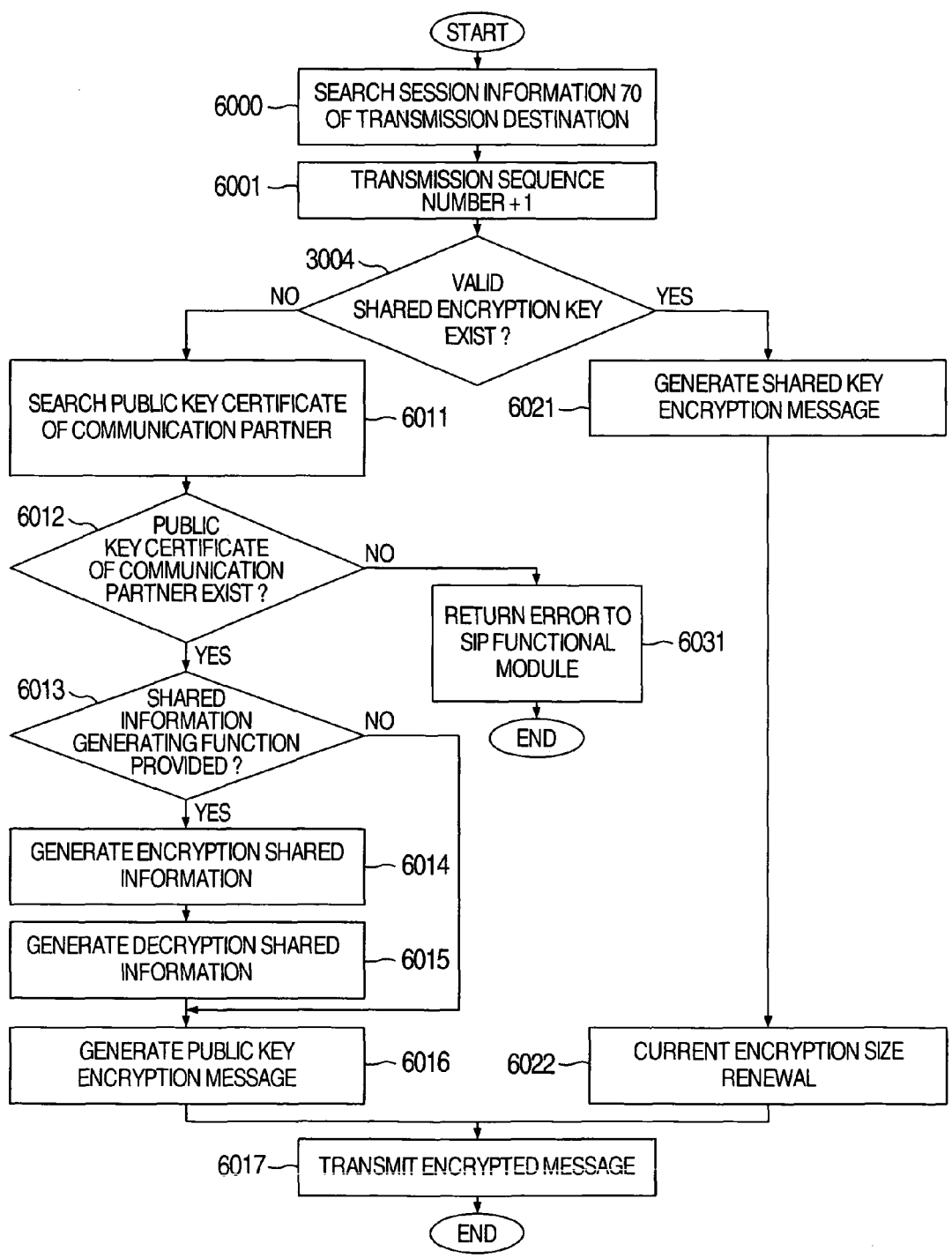
FIG. 13 is a flow chart illustrating the operation to be executed when the encryption functional module 302 receives the SIP message from the SIP functional module 301 according to the second embodiment.

Next, upon reception of the REGISTER message 41 from the SIP functional module $301_1$, the encryption functional module $302_1$ generates the encrypted data 50 of the public key encryption message type including the REGISTER message 41, following the operation sequence shown in FIG. 13 (S55), and transmits the encrypted data to the encryption functional module $302_3$ via the communication functional module 303 (S56).

The operation illustrated in FIG. 13 will be described.

FIG. 13 is a flow chart illustrating the operation to be executed when the encryption functional module 302 receives the SIP message from the SIP functional module 301.

Upon reception of the SIP message from the SIP functional module 301, the encryption functional module 302 searches first the session information 70 of the transmission destination (Step 6000).

Next, the encryption functional module 301 increments the transmission sequence number by 1 (Step 6001).

Next, the encryption functional module 302 confirms whether the shared encryption key information 710 of the session information 70 is valid (Step 6001).

If the shared encryption key information 710 is valid, the process at Step 6021 and subsequent processes are executed. These processes are the same as those at Step 3021 and subsequent Steps shown in FIG. 8, and the description thereof is omitted.

If the shared encryption key information 710 is not valid, the public key certificate 62 of the transmission partner is searched at Step 6011.

If the public key certificate 62 does not exist, an error is notified to the SIP functional module 301 to thereafter terminate the process (Step 6031).

If the public key certificate 62 exists, then it is.confirmed whether the encryption functional module 302 has the function of generating the shared information.

If the encryption functional module 302 does not have the shared information generating function, the process at Step 6016 and subsequent processes are executed.

If the shared information generating function is provided, the shared encryption key_information 710 is renewed at Step 6014. Namely, newly generated random numbers are set to the shared encryption key ID 711, encryption key value 713 and secret value 715, 0 is set to the maximum encryption size 718, and an empty character string is set to the expiration time 716. At the same time, the name of a usable shared key encryption algorithm is set to the encryption algorithm name 712, and the name of a usable message authentication algorithm name is set to the message authentication algorithm name 714. An expire time is calculated by adding a predetermined term to the current time, and set to the expiration time 716, and a predetermined size is set to the maximum encryption size 717.

The shared decryption key_information 720 is renewed at Step 6015. Namely, newly generated random numbers are set to the shared decryption key ID 721, decryption key value 723 and secret value 725, 0 is set to the maximum decryption size 728, and an empty character string is set to the expiration time 726. At the same time, the name of a usable common key decryption algorithm is set to the decryption algorithm name 722, and the name of a usable message authentication algorithm name is set to the message authentication algorithm name 724. A expire time is calculated by adding a predetermined term to the current time, and set to the expiration time 726, and a predetermined size is set to the maximum decryption size 727.

Next, the encryption functional module 302 executes Step 6016.

The processes at Step 6016 and subsequent Steps are the same as those at Step 3013 and subsequent Steps shown in FIG. 8, and the description thereof is omitted.

The operation to be executed when the encryption functional module 302 receives the SIP message from the SIP functional module 301 according to the embodiment has been described above.

The encrypted data 50 of the public key encryption message type generated in this embodiment includes an extended transmission key field 5140 in place of the transmission key field 5120.

Figure 12:
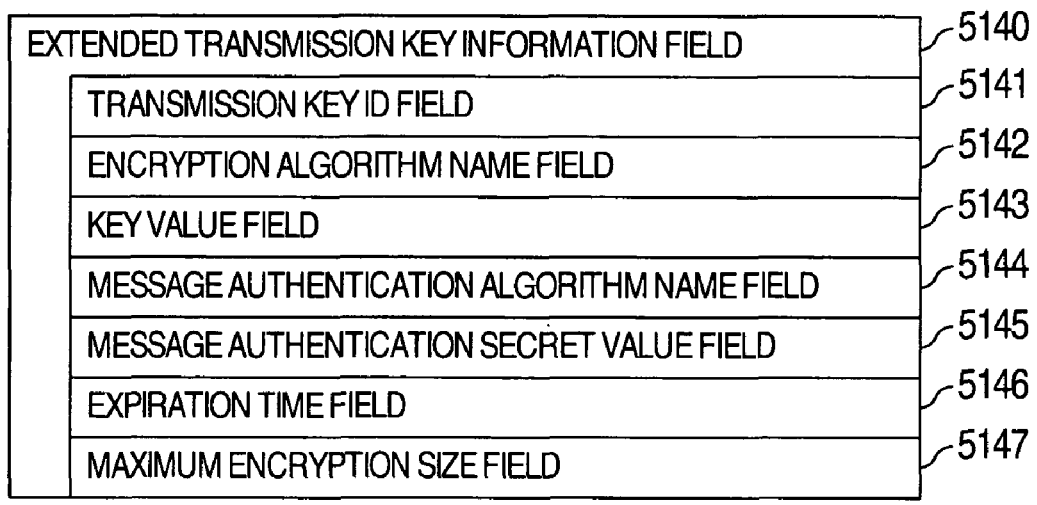
FIG. 12 is a diagram showing an example of the structure of an extended transmission key field 5140.

FIG. 12 is a diagram showing the structure of the extended transmission key field 5140.

The extended transmission key field 5140 is constituted of: a transmission key ID field 5141 set with the shared encryption key ID 711; an encryption algorithm name field 5142 set with the encryption algorithm name 712; a key value field 5143 set with the encryption key value 713; a message authentication algorithm name field 5144 set with the message authentication algorithm name 714; a message authentication secret value field 5145 set with the secret value 715; an expiration time field 5146 set with the expiration time 716; and a maximum encryption size field 5147 set with the maximum encryption size 717.

Referring to FIG. 11, the encryption functional module $302_3$ received the encrypted data 50 decrypts the encrypted data 50, following the operations shown in FIGS. 9 and 10 (S57), and extracts the REGISTER message 41 to pass the message to the SIP functional module $301_3$ (S58).

Next, the encryption functional module $302_3$ initializes the shared encryption key information 710 contained in the session information 70 of the user 1 (S59).

The SIP functional module $301_3$ received the REGISTER message 41 registers the IP address by processing the REGISTER message 41, and generates a response message 42 (S60).

Next, the SIP functional module $301_3$ instructs the encryption functional module $302_3$ to transmit the response message 42 to the SIP functional module $301_1$ (S61).

Upon reception of the response message 42 from the SIP functional module $301_3$, the encryption functional module $302_3$ encrypts the response message 42, following the operation shown in. FIG. 13 (S63).

In this case, since the shared encryption key information 710 contained in the session information of the user 1 was initialized at S59, the shared encryption key information 710 and shared decryption key information 720 is newly generated by all means (S62).

The shared decryption key information 720 contained in the session information 70 is renewed to the value in the extended transmission key field 5140 contained in the encrypted data 50 decrypted at S57.

Next, the encryption functional module $302_3$ generates the encrypted data 50 of the shared key encryption message type including the shared encryption key information 710 and shared decryption key information 720, and transmits the encrypted data to the encryption functional module $302_1$ via the communication functional module 303 (S64).

The encryption functional module $302_1$ received the encrypted data 50 decrypts the encrypted data 50 to extract the shared encryption key information 710 and shared decryption key information 720, and renews the session information 70 of the session management server 30 (S65).

The encryption functional module $302_1$ decrypts the encrypted data 50 to extract the response message 42 and pass the response message 42 to the SIP functional module $301_1$ (S66).

The operation of the user terminal 10 and session management apparatus 30 of the second embodiment has been described above. In the second embodiment, the operation of the SIP functional module 301 and encryption functional module 302 to be executed when the application server 20 registers the relation between the SIP identifier 61 of the service 2 and the IP address of the application server 20 in the session management apparatus 30 is similar to that described previously, and the description thereof is omitted.

Next, description will be made on the operation of the SIP functional module 301 and encryption functional module 302 to be executed when the shared encryption key information 710 or shared decryption key information 720 of the session information 70 of the session management apparatus 30 expires.

If the shared encryption key information 710 or shared decryption key information 720 of the session information 70 of the session management apparatus 30 expires (S67), the encryption functional module $302_1$ transmits to the SIP functional module $301_1$ an expiration notice notifying shared information expiration (S68).

Upon reception of the expiration notice, the SIP functional module $301_1$ instructs the encryption functional module $302_1$ to initialize the session information corresponding to the session management apparatus 30 (S69).

The following operation (S70 to S84) of the SIP functional module 301 and encryption functional module 302 is similar to the operation of the SIP functional module 301 and encryption functional module 302 to be executed when the user terminal 10 registers the relation between the SIP identifier 61 of the user 1 and the IP address of the user terminal 10 in the session management apparatus 30.

In the second embodiment, the other operations of each functional module is the same as that of the first embodiment.

Further, in the second embodiment, the encryption functional module 302 of the user terminal 10 and application server 30 does not generate the shared encryption key information 710, but the encryption functional module 302 of the session management apparatus 30 generates the shared encryption key_information 710 and notifies this information. Accordingly, secure common information for both the user terminal 10 and application server 30 having a low processing capability can be generated at high speed.

Furthermore, in the second embodiment, when the shared encryption key information 710 or shared decryption key information 720 becomes invalid, the encryption functional module 302 notifies the SIP functional module 301 of shared information expiration and the notified SIP functional module 301 generates the REGISTER message 41, whereas when the SIP functional module 301 transmits the SIP message (e.g., INVITE message 43) other than the REGISTER message 41, the encrypted data 50 of the shared key encryption message type is generated always. Connection between the application client 101 and service 2 can be performed at high speed.

Furthermore, in the second embodiment, before the SIP functional module 301 generates the REGISTER message 41, the shared encryption key_information 710 and shared decryption key information 720 of the encryption functional module 302 is initialized and the REGISTER message 41 is encrypted always by using the public key encryption message type. The session management apparatus 30 can authenticate again the transmission source at the same time when the REGISTER message 41 is processed.

The specification and drawings are, accordingly, to be regarded in an illustrative rather than a restrictive sense. It will, however, be evident that various modifications and changes may be made thereto without departing from the spirit and scope of the invention as set forth in the claims.

The invention claimed is:

1. An encrypted data communication system having at least two apparatuses connected via a network for transmitting/receiving encrypted data, each apparatus comprising a processor to implement an encryption function module for generating encrypted data and for decrypting encrypted data received from another apparatus, and a communication functional module for communicating with the another apparatus via the network to transmit/receive encrypted data, wherein:

each apparatus further comprises a storage storing session information including shared encryption key information for an encryption process and shared decryption key information for a decryption process, the shared encryption key information and the shared decryption key information being respectively shared with the another apparatus;

the encryption function module to be implemented by the processor generates the shared decryption key information in the session information, acquires the shared decryption key information from the session information, and generates encryption data containing upper layer protocol data and the shared decryption key information as reception key information;

the encryption function module to be implemented by the processor extracts a reception key information from received encrypted data and stores the received reception key information as the shared encryption key information;

encrypted data generated by the encryption function module is encrypted by using the shared encryption key information in the session information if the shared encryption key information is valid; and the encryption function module decrypts the encrypted data by using the shared decryption key information acquired from the session information.

2. The encrypted data communication system according to claim 1, wherein:

each apparatus further comprises a public key database storing a public key of another apparatus and a public key pair database of storing a private key of the apparatus;

if the shared encryption key information received from the reception side apparatus cannot be acquired from the session information, the encryption function module acquires the public key from the public key database and generates the encrypted data encrypted by using the public key; and the encryption function module decrypts the encrypted data by using the private key acquired from the public key pair database.

3. The encrypted data communication system according to claim 2, wherein:

the encryption function module adds a digital signature to the encrypted data by using the private key acquired from the public key pair database; and the encryption function module executes a verification process for the digital signature added to the encrypted data by using the public key of the transmission source apparatus acquired from the public key database.

4. The encrypted data communication system according to claim 2, wherein:

each apparatus includes a SIP client and a SIP server each provided with a SIP functional module of generating and processing a SIP message;

the upper layer protocol data to be encrypted and decrypted by the encryption function module is the SIP message; and when the SIP functional module of the SIP client generates a REGISTER message, the encryption function module of the SIP client generates the encrypted data including the REGISTER message by using the public key acquired from the public key database.

5. The encrypted data communication system according to claim 4, wherein:

an expiration time is set to the shared encryption key information and the shared decryption key information; and the SIP functional module of the SIP client generates the REGISTER message if the expiration time of either the shared encryption key information or the shared decryption key information expires.

6. The encrypted data communication system according to claim 3, wherein:

each apparatus further comprises a SIP functional module of processing a SIP message;

the upper layer protocol data to be encrypted and decrypted by the encryption function module is the SIP message;

the public key database is provided with a function of managing a correspondence between a SIP identifier and the public key;

the encryption function module passes the SIP message obtained by decrypting the encrypted data and the SIP identifier corresponding to the public key used for decrypting the SIP message, to the SIP functional module; and the SIP functional module processes the SIP message if the SIP identifier is coincident with the SIP identifier of a transmission partner contained in the SIP message.

7. An encrypted data communication method for at least two apparatuses connected via a network for transmitting/receiving encrypted data, wherein: each apparatus comprises a processor to implement an encryption function module for generating encrypted data and for decrypting encrypted data received from another apparatus; and a communication functional module for communicating with the another apparatus via the network to transmit/receive encrypted data, and each apparatus includes a storage, the method comprising the steps of:

storing in the storage of an apparatus session information including shared encryption key information for an encryption process and shared decryption key information for a decryption process. the shared encryption key information and the shared decryption key information being respectively shared with the another apparatus;

in the encryption function module to be implemented by the processor, generating the shared decryption key information in the session information, acquiring the shared decryption key information from the session information, and generating encryption data contain upper layer protocol data and the shared decryption key information as a reception key information encrypted by using the shared encryption key information in the session information if the shared encryption key information is valid;

in the encryption function module to be implemented by the processor, extracting a reception key information from received encrypted data and storing the received reception key information as the shared encryption key information; and in the encryption function module, decrypting the encrypted data by using the shared decryption key information acquired from the session information.

8. An encrypted data communication method according to claim 7, wherein:

the reception key information contained in the encrypted data is shared encryption key information to be used for an encryption function module on a reception side apparatus of the encrypted data to generate encrypted data after receiving the encrypted data.

9. An encrypted data communication method according to claim 8, wherein:

the encrypted data to be generated is data encrypted by using the shared encryption key information if the shared encryption key information is already notified from the reception side apparatus.

10. An encrypted data communication method according to claim 8, wherein:

the encrypted data to be generated is data encrypted by using a public key of the reception side apparatus if the shared encryption key information is still not notified from the reception side apparatus.

11. An encrypted data communication method according to claim 9, wherein:

the encryption function module signs the encrypted data electronically by using a private key of a transmission source apparatus.

12. An encrypted data communication method according to claim 10, wherein:

the upper layer protocol data is a SIP message, and the encryption function module generates the encrypted data by using the public key of the reception side apparatus when a REGISTER message is to be transmitted.

13. An encrypted data communication method according to claim 7, wherein:

the encryption function module on the one of the apparatuses uses the reception key information as shared decryption key information to decrypt received data after receiving the encrypted data.

* * * * *